United States Patent
Edwards et al.

(10) Patent No.: US 11,343,276 B2
(45) Date of Patent: May 24, 2022

(54) SYSTEMS AND METHODS FOR DISCOVERING AND ALERTING USERS OF POTENTIALLY HAZARDOUS MESSAGES

(71) Applicant: KnowBe4, Inc., Clearwater, FL (US)

(72) Inventors: Benjamin Edwards, Palm Harbor, FL (US); Alin Irimie, Clearwater, FL (US); Greg Kras, Dunedin, FL (US)

(73) Assignee: KnowBe4, Inc., Clearwater, FL (US)

( * ) Notice: Subject to any disclaimer, the term of this patent is extended or adjusted under 35 U.S.C. 154(b) by 242 days.

(21) Appl. No.: 16/031,347

(22) Filed: Jul. 10, 2018

(65) Prior Publication Data
US 2019/0020682 A1 Jan. 17, 2019

Related U.S. Application Data

(60) Provisional application No. 62/532,285, filed on Jul. 13, 2017.

(51) Int. Cl.
| | |
|---|---|
| *H04L 29/06* | (2006.01) |
| *H04L 51/42* | (2022.01) |
| *H04L 51/18* | (2022.01) |
| *H04L 51/00* | (2022.01) |
| *H04L 51/08* | (2022.01) |

(52) U.S. Cl.
CPC .......... *H04L 63/1483* (2013.01); *H04L 51/12* (2013.01); *H04L 51/18* (2013.01); *H04L 51/22* (2013.01); *H04L 63/0245* (2013.01); *H04L 51/08* (2013.01); *H04L 63/1416* (2013.01)

(58) Field of Classification Search
CPC ............. H04L 63/1483; H04L 63/1416; H04L 63/0245
See application file for complete search history.

(56) References Cited

U.S. PATENT DOCUMENTS

| | | |
|---|---|---|
| 7,599,992 B2 | 10/2009 | Nakajima |
| 8,041,769 B2 | 10/2011 | Shraim et al. |
| (Continued) | | |

FOREIGN PATENT DOCUMENTS

WO WO-2016/164844 A1 10/2016

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

(Continued)

*Primary Examiner* — Dao Q Ho
(74) *Attorney, Agent, or Firm* — Foley & Lardner LLP

(57) ABSTRACT

This disclosure generally revolves around providing users with advance warning that a message that they have received may be suspicious. The user may not be aware of known threats, may not recognize threats in real time, or may not be aware of new threats, and therefore may unintentionally interact with a hazardous message. A security awareness system, on the other hand, is aware of known threats and may become aware of new threats more quickly than users can be trained to identify them. The system may notify the user when one of these threats are found in their messages. The disclosure further provides systems and methods for updating the security awareness training for users for new threats that appear.

18 Claims, 27 Drawing Sheets

(56) References Cited

U.S. PATENT DOCUMENTS

| | | |
|---|---|---|
| 8,464,346 B2 | 6/2013 | Barai et al. |
| 8,484,741 B1 | 7/2013 | Chapman |
| 8,615,807 B1 | 12/2013 | Higbee et al. |
| 8,635,703 B1 | 1/2014 | Belani et al. |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 2007/0142030 A1 | 6/2007 | Sinha et al. |
| 2010/0031358 A1* | 2/2010 | Elovici ............ H04L 43/00 726/24 |
| 2010/0211641 A1 | 8/2010 | Yih et al. |
| 2010/0269175 A1 | 10/2010 | Stolfo et al. |
| 2010/0306845 A1* | 12/2010 | Vaithilingam .......... H04L 51/12 726/23 |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1* | 10/2016 | Higbee ............ H04L 63/1433 |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0103052 A1 | 4/2018 | Choudhury et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2021/0075827 A1 | 3/2021 | Grealish |
| 2021/0185075 A1 | 6/2021 | Adams |
| 2021/0194924 A1 | 6/2021 | Heinemeyer et al. |

OTHER PUBLICATIONS

Palka et al., "Dynamic phishing content using generative grammars," Software Testing, Verification and Validation Workshops (ICSTW), 2015 IEEE Eighth International Conference, Date of Conference:Apr. 13-17, 2015,IEEE Xplore, pp. 1-8.

* cited by examiner

*300*

```
Intercepting an email to be displayed on a display of the
client device
310
          ↓
Identifying, prior to the email being displayed, content of
the email
320
          ↓
Transmitting portions of the content of the email to a
server to determine by the server whether the email is a
suspected phishing email
322
          ↓
Receiving, from the server, one of identification of or
information on the one or more attributes of the content
of the email associated with the phishing email
324
          ↓
Determining, responsive to one or more rules, prior to
the email being displayed, that the content of the email
has one or more attributes associated with a phishing
email
330
          ↓
Prior to the email being displayed, modifying the email
to provide one or more notifications to be displayed with
the email to identify that the email is a suspected
phishing email
340
```

*Fig. 3G*

SYSTEMS AND METHODS FOR DISCOVERING AND ALERTING USERS OF POTENTIALLY HAZARDOUS MESSAGES

RELATED APPLICATION

This application claims the benefit of and priority to 62/532,285, titled "SYSTEMS AND METHODS FOR DISCOVERING AND ALERTING USERS OF POTENTIALLY HAZARDOUS MESSAGES," and filed Jul. 13, 2017 which is incorporated herein by reference in its entirety for all purposes.

FIELD OF THE DISCLOSURE

This disclosure is directed to systems and methods for discovering and alerting users of messages that may be hazardous or phishing messages.

BACKGROUND OF THE DISCLOSURE

A phishing attack involves an attempt to acquire sensitive information such as usernames, passwords, credit card details, etc., often for malicious reasons, possibly by masquerading as a trustworthy entity. For example, a message such as an email may be sent to a targeted user, the email having an attachment that performs malicious actions when executed or a link to a webpage that either performs malicious actions when accessed or prompts the user to execute a malicious program. Other attack vectors may also be used to perform malicious actions on a user, for example vishing (using voicemail or automated voice calls) and smishing (using SMS text messages) are two examples of other messages. Any additional method of sending a message to, or interacting with, a user can be used to perform a malicious action. Malicious actions may be malicious data collection or actions harmful to the normal functioning of a device on which the email was activated, or any other malicious actions capable of being performed by a program or a set of programs.

It can be useful to perform simulated attacks on a user or a set of users. Simulated attacks allow an organization to determine the level of vulnerability to harmful attacks of a user or set of users. This knowledge can be used by interne technology organizations to reduce this level of vulnerability through tools or training. An example of a simulated attack is a simulated phishing attack. A simulated phishing campaign is a collection of simulated phishing attacks performed over a period of time, for one or more users.

In a simulated phishing attack, there are various ways to show a user after they click a link in a mail what aspects of the mail they should have recognized as being suspicious, and because it was a simulated phishing email, there is no harm done to the user or the organization. However, there is currently no advance warning system for actual phishing emails that the user receives. Therefore, there is no opportunity to warn the user to look for known flags in an email message that indicate that the email could contain a threat. If there was a way to warn a user about potential threats in a specific email when the user first views or open the emails, then the user would be less likely to interact with the email, and additionally more likely to notify the IT administrator of a potential attack.

BRIEF SUMMARY OF THE DISCLOSURE

This disclosure generally revolves around providing users with advance warning that a message that they have received may be suspicious. The user may not be aware of known threats, may not recognize threats in real time, or may not be aware of new threats, and therefore may unintentionally interact with a hazardous message. A security awareness system, on the other hand, is aware of known threats and may become aware of new threats more quickly than users can be trained to identify them. The system may notify the user when one of these threats are found in their messages. The disclosure further provides systems and methods for updating the security awareness training for users for new threats that appear.

The advanced hazard warning system may be used to identify messages that are suspicious of being phishing emails, prior to the email being displayed. The advanced hazard warning system can identify these suspicious emails and notify the user, so that the user is aware that the email is suspicious, and does not interact with it, unintentionally causing harm.

Methods, systems and apparatus are provided which allow the advanced hazard warning system to analyze emails received by users and to detect any kind of suspicious attributes associated with the email. The advanced hazard warning system is operable to intercept an email prior to the email being displayed on the client device. The system identifies the content of the email and determines that the content of the email has one or more attributes associated with a phishing email by using one or more rules. In response to a user previewing or opening an email, the system further modifies the email to provide one or more notifications to be displayed with the email to identify to the user that the email is a suspected phishing email.

In one embodiment, the system further comprises a plug-in that is installed in the user's email client.

In one embodiment, the system further includes the obtaining the content of the email and applying one or more rules to the content of the email.

In one embodiment, the system further includes a client transmitting portions of the content of the email to a server to determine, by the server, whether the email is a suspected phishing email.

In one embodiment, the system further includes the client receiving an indication from the server that the content of the email is associated with a phishing email.

In one embodiment, the system further includes receiving identification or information on one or more attributes of the content of the email, the one or more attributes associated with a phishing email.

In one embodiment, the system further includes the server, receiving an indication from a second server identifying whether portions of the email include one or more attributes associated phishing emails.

In one embodiment, the system further includes receiving from the server a determination that a reply-to-address of the email does not correspond to a sender of the email.

In one embodiment, the system further includes receiving from the server a determination that a link in the content of the email has a number of subdomains exceeding a predetermined threshold.

In one embodiment, the system further includes the client receiving one or more rules from a server.

In one embodiment, the method further includes the advanced hazard warning system comprising a plug-in that is installed in the user's email client.

In one embodiment, the method further includes the obtaining the content of the email.

In one embodiment, the method further includes applying one or more rules to the content of the email.

In one embodiment, the method further includes a client transmitting portions of the content of the email to a server to determine, by the server, whether the email is a suspected phishing email.

In one embodiment, the method further includes the client receiving an indication from the server that the content of the email is associated with a phishing email.

In one embodiment, the method further includes receiving identification or information on one or more attributes of the content of the email, the one or more attributes associated with a phishing email.

In one embodiment, the method further includes the server, receiving an indication from a second server identifying whether portions of the email include one or more attributes associated phishing emails.

In one embodiment, the method further includes receiving from the server a determination that a reply-to-address of the email does not correspond to a sender of the email.

In one embodiment, the method further includes receiving from the server a determination that a link in the content of the email has a number of subdomains exceeding a predetermined threshold.

In one embodiment, the method further includes the client receiving one or more rules from a server.

In one embodiment, the method further includes displaying one or more notifications with the email responsive to the user, one of previewing or opening an email.

In one embodiment, the method further includes notifying a user with one or more notifications comprising a text box between a header of the email and a body of the email.

In one embodiment, the method further includes notifying a user with one or more notifications comprising a pop-box displaying a warning to the user.

In one embodiment, the method further includes modifying one of the format or the content of an email to provide a user with one or more notifications that the email may be phishing email.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3G depicts an implementation of a method for intercepting and modifying an email wherein the method comprises transmitting portions of the content of the email to a server and the server determining whether the email is a suspected phishing email and the client receiving from the server one or more of identification of or information on one or more attributes of the content of the email associated with a phishing email;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for discovering and notifying users, prior to the user opening a message, of the possibility that the message they have received contains one or more hazards.

A. Computing and Network Environment

Figure 1A:
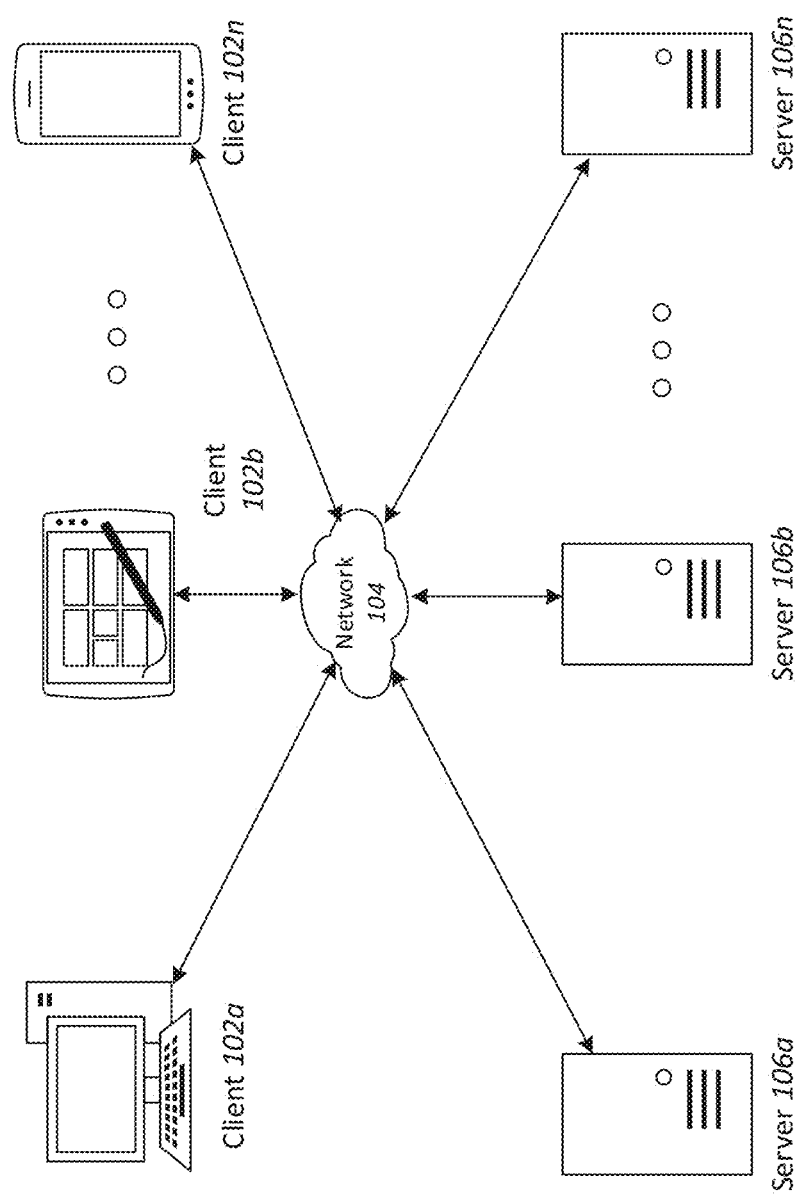
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers 106 may be referred to as a server farm (not shown) or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
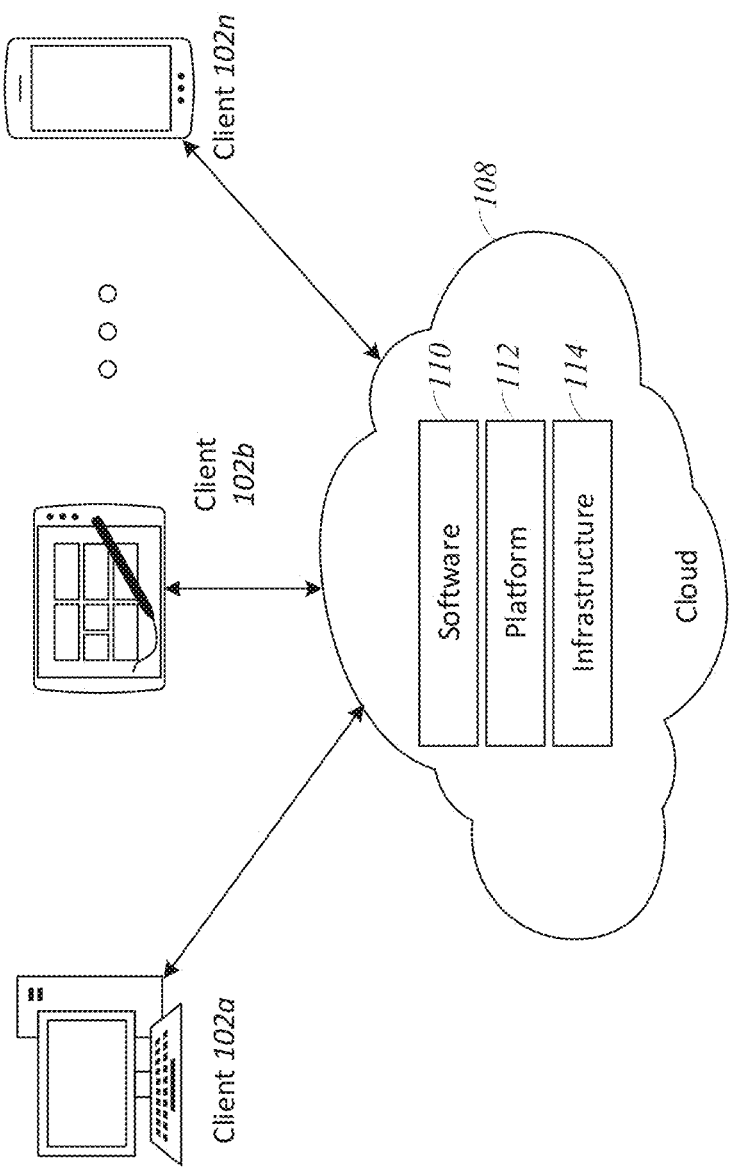
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with a cloud 108 over one or more networks 104. Clients 102 may include, e.g., thick clients, thin clients, and zero clients.

A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients 102. The servers 106 may be located off-site in remote geographical locations as disclosed above or otherwise. Public clouds may be connected to the servers 106 over a public network. Private clouds may include private servers 106 that are physically maintained by clients 102 or owners of clients 102. Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS 114 may refer to a user renting the use of infrastructure resources that are needed during a specified time period. IaaS providers may offer storage, networking, servers or virtualization resources from large pools, allowing the users to quickly scale up by accessing more resources as needed. Examples of IaaS 114 include AMAZON WEB SERVICES provided by Amazon.com, Inc., of Seattle, Wash., RACK-SPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS 112 include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS 110 include GOOGLE APPS provided by Google Inc., SALESFORCE provided by Salesforce.com Inc. of San Francisco, Calif., or OFFICE 365 provided by Microsoft Corporation. Examples of SaaS 110 may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server 106 or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
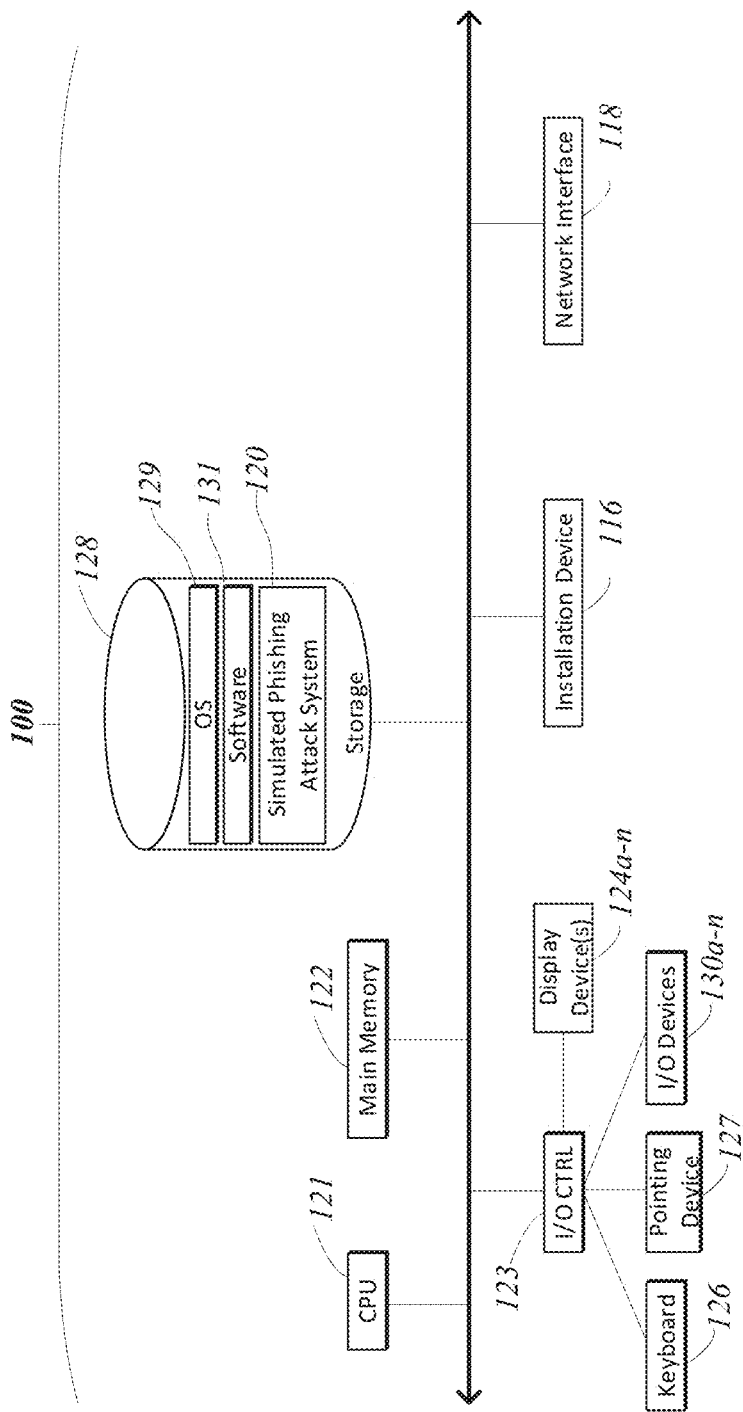
FIGS. 1C and 1D are block diagrams depicting embodiments of computing devices useful in connection with the methods and systems described herein.
Figure 1D:
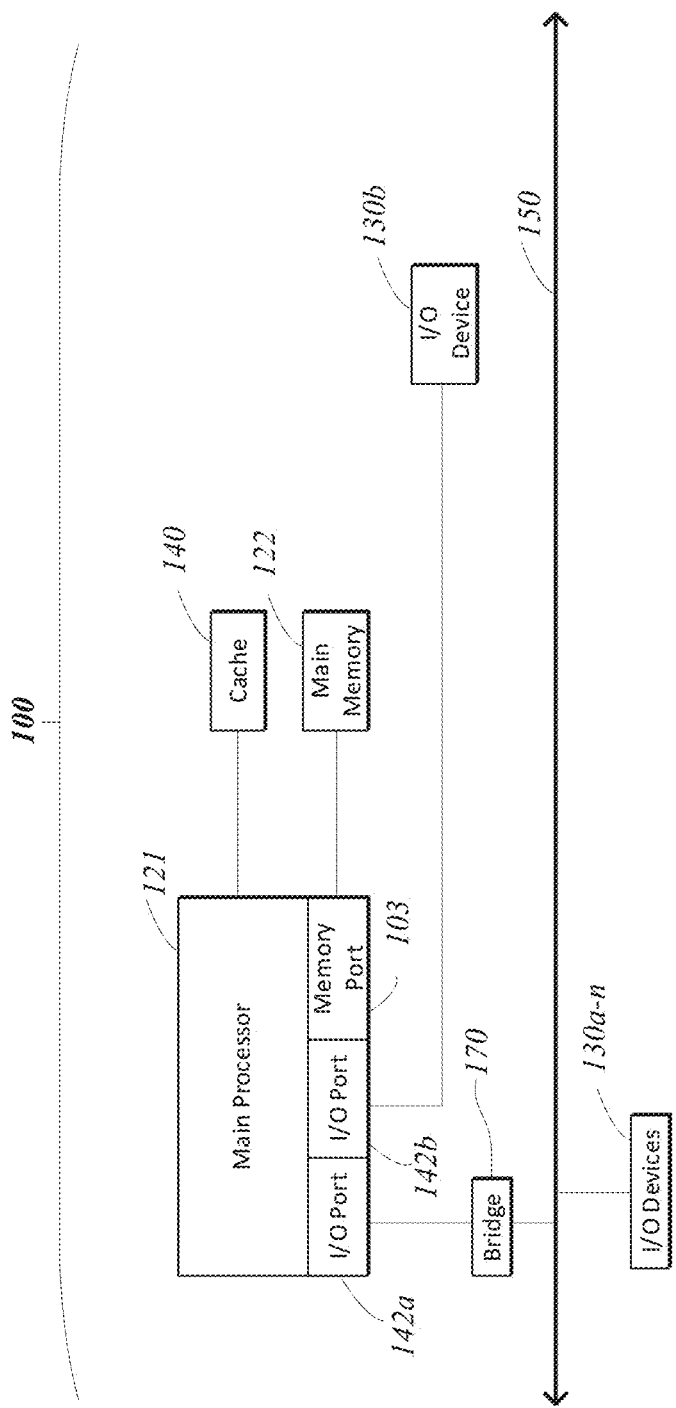

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit (CPU) 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system 129, a software 131, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), I/O ports 142a-142b, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AND PHENOM IIX2, INTEL CORE i5 and INTEL CORE i7.

Main memory unit 122 may include one or more memory chips capable of storing data and allowing any storage location to be directly accessed by the central processing unit 121 (e.g., microprocessor). Main memory unit 122 may be volatile and faster than storage device 128 memory. Main memory units 122 may be Dynamic random-access memory (DRAM) or any variants, including static random-access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage device 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 (e.g., a main processor) communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the main processor 121 communicates with various I/O devices 130 via a local system bus 150. Various buses may be used to connect the main processor 121 to any of the I/O devices 130 via I/O ports 142a-142b, including a PCI bus, a PCI-X bus, or a PCI-Express bus, or a NuBus. For embodiments in which the I/O device is a video display device 124, the main processor 121 may use an Advanced Graphics Port (AGP) to communicate with the display device 124 or the I/O controller 123 for the display device 124. FIG. 1D depicts an embodiment of a computing device 100 in which the main processor 121 communicates directly with I/O device 130b or other processors 121' (not shown) via HYPERTRANSPORT, RAPIDIO, or INFINIBAND communications technology (via I/O port 142b). FIG. 1D also depicts an embodiment in which local busses and direct communication are mixed: the main processor 121 communicates with I/O device 130a using a local interconnect bus while communicating with I/O device 130b directly (via I/O port 142a).

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

I/O devices 130a-130n may include a combination of multiple input or output devices, including, e.g., Microsoft KINECT, Nintendo Wiimote for the WII, Nintendo WII U GAMEPAD, or Apple IPHONE. Some I/O devices 130a-130n allow gesture recognition inputs through combining some of the inputs and outputs. Some I/O devices 130a-130n provides for facial recognition which may be utilized as an input for different purposes including authentication and other commands. Some I/O devices 130a-130n provides for voice recognition and inputs, including, e.g., Microsoft KINECT, SIRI for IPHONE by Apple, Google Now or Google Voice Search.

Additional I/O devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices 124a-124n may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b (not shown) connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the computing device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system 129 or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage device 128 may be non-volatile, mutable, or read-only. Some storage devices 128 may be internal and connect to the computing device 100 via a system bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some computing devices 100 (e.g., client devices 102) may not require a non-volatile storage device 128 and may be thin clients 102 or zero clients 102. Some storage devices 128 may also be used as an installation device 116 and may be suitable for installing software and programs. Additionally, the operating system 129 and the software 131 can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computing device 100 (i.e., computer system) can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computing device 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 (i.e., client device) includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Discovering and Notifying Users of Potentially Hazardous Messages This disclosure generally relates to systems and methods for providing users with advance warning that a message they have received may be suspicious. In one embodiment, the system is a helper tool for employees that allows employees to be warned in real time about potential hazards in emails. A user may not be aware of known threats, may not recognize threats in real time, or may not be aware of new threats, and therefore may unintentionally interact with a hazardous message. A security awareness system is aware of known threats and may become aware of new threats more quickly than users can be trained to identify them.

Phishing attacks occur frequently by way of phishing emails. Phishing emails are typically masqueraded as emails from parties known to the users, such as an executive of a company that employs the users. The phishing emails may be designed to appear interesting to the users, and may offer or promise, for example, access to an interesting tidbit of news, access to useful computer software, access to knowledge of how to perform a money-making scheme, or any other thing that may be of interest. In some embodiments, the phishing emails may request that the user perform a certain action, such as clicking on a link, providing sensitive information by replying to the email, or transferring money to an account owned by the attacker and then sending a reply email to confirm that the money has been transferred. A common attack vector used by phishing emails is to get users to click on links in an email or to click on links delivered in documents attached to phishing emails. Any such action that a user may perform on a simulated phishing email or an actual phishing email is referred to as an event.

In simulated phishing campaigns, there are various ways to show a user, after they click on a link in a simulated phishing email, what the aspects of the simulated phishing email were that they should have recognized as being suspicious, and because it was a simulated phishing email, there is no harm done to the user or organization. However, there is currently no advance warning system for actual phishing emails, therefore there is no opportunity to warn the user when the user previews or opens the email that the email may contain a threat. The user may not recognize hazards that may pose a threat to the user and/or their organization. If there was a way to warn the user about potential threats in specific emails as they preview or open the emails, then the user would be much more likely not to interact with that email, and the user may potentially notify the IT administrator or security awareness system of a potential attack. Threats change very quickly, and new threats are established all the time, and the user may not have been trained on the latest threats that show up in their inbox purely because they are too new.

The present feature offers the benefit of warning a user that a message they have received may be a phishing email when the user previews or opens the message and before the user interacts with the message. The invention identifies specific characteristics in an email that are likely to be found in a true phishing email. In some embodiments, the advanced hazard warning system identifies IP addresses with strange ports. In some embodiments, the advanced hazard warning system identifies URLs with IP addresses as hostnames. In some embodiments, the advanced hazard warning system identifies hyperlinks in a received mail. In some embodiments, the advanced hazard warning system identifies links with a suspicious number of subdomains. In some embodiments, the advanced hazard warning system identifies links with the top-level domain (TLD) in strange locations. In some embodiments, the advanced hazard warning system identifies other known phishing email characteristics. When the advanced hazard warning system identifies hazards, the system will notify the user that that some of the identified hazards are in the email that the user received. This feature may therefore keep the user from interacting with a dangerous email by warning them that it may not be safe, and at the same time the feature provides training to the user so that the user will think about these types of characteristics when they receive any email and then decide how to proceed accordingly.

Some aspects of the feature are added to the user's email client (e.g., outlook, Gmail) as a plug-in. The feature is enabled to intercept an email when the user tries to open or preview the email, in order to look for the hazards that are known to be associated with phishing emails. The system provides the user with notifications when emails that are opened or previewed include known hazards in them. These notifications can be in different forms. In some embodiments, the notification can be in the form of a block of warning text that is positioned between a header of the email and a body of the email. In some embodiments, the notifications are in the form of flags in one or more of the header of the email or the body of the email. In some embodiments, the notification can also be as highlights in one or more of the header of the email or the body of the email, where the feature would highlight the portions of the email where it detects hazards.

There are many simulated methods to teach a user to recognize phishing emails, however, there is always the chance the user may not recognize the threats to the user or their organization in real time. Security awareness systems maintain a list of warning characteristics that can be used to identify whether an email is a phishing email. These warning characteristics may be taught to users using training materials that teach users to identify potential phishing emails. The same warning characteristics may be incorporated in the feature to be used when analyzing information received by email to detect potential threats. The feature may be aware of new threats more quickly than users can be trained to avoid them.

Figure 2A:
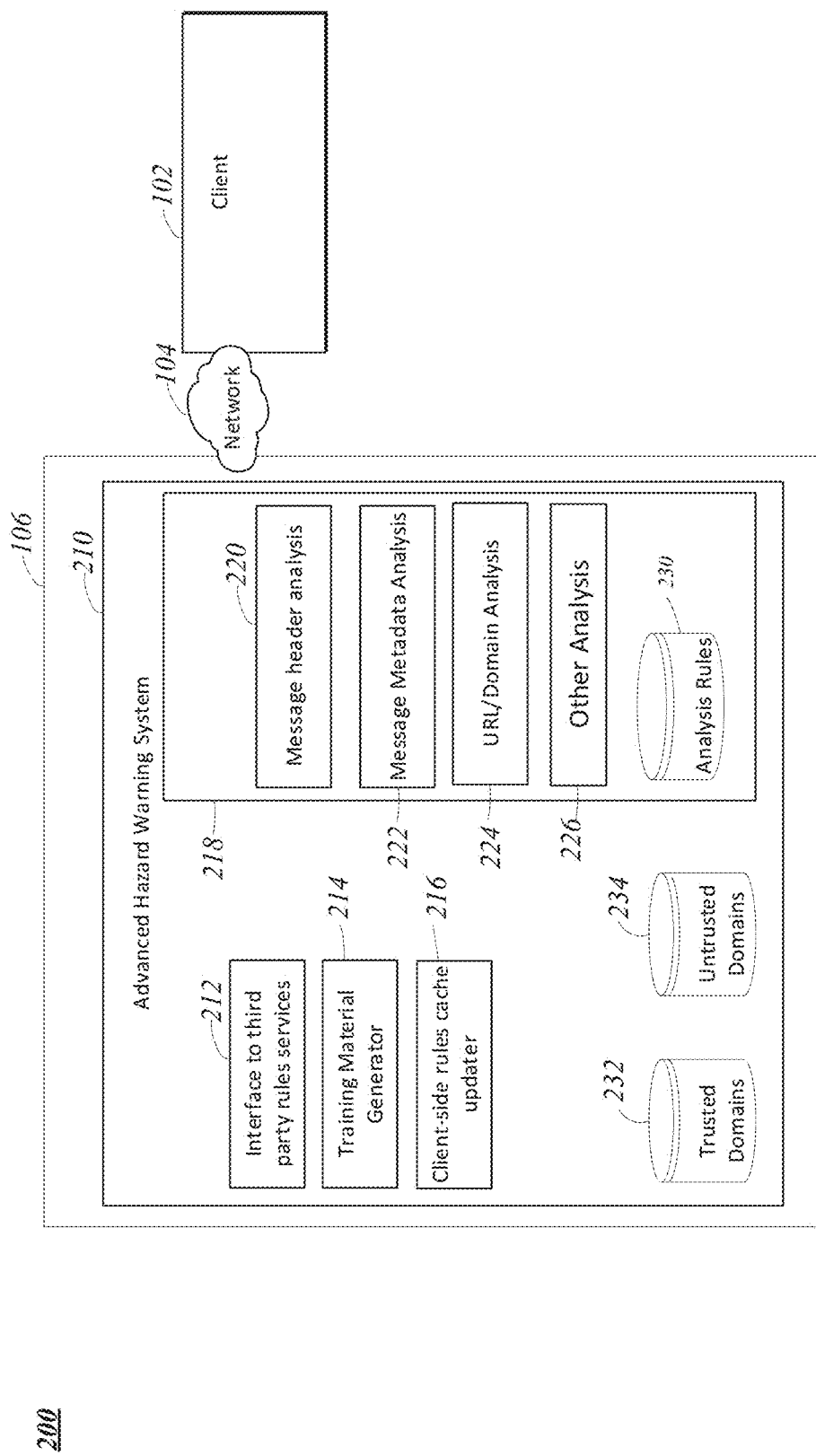
FIGS. 2A and 2B depicts some of the architecture of an implementation of a system that includes a server, a client device, and a network configured to provide advance hazard warnings for untrusted messages.
Figure 2B:
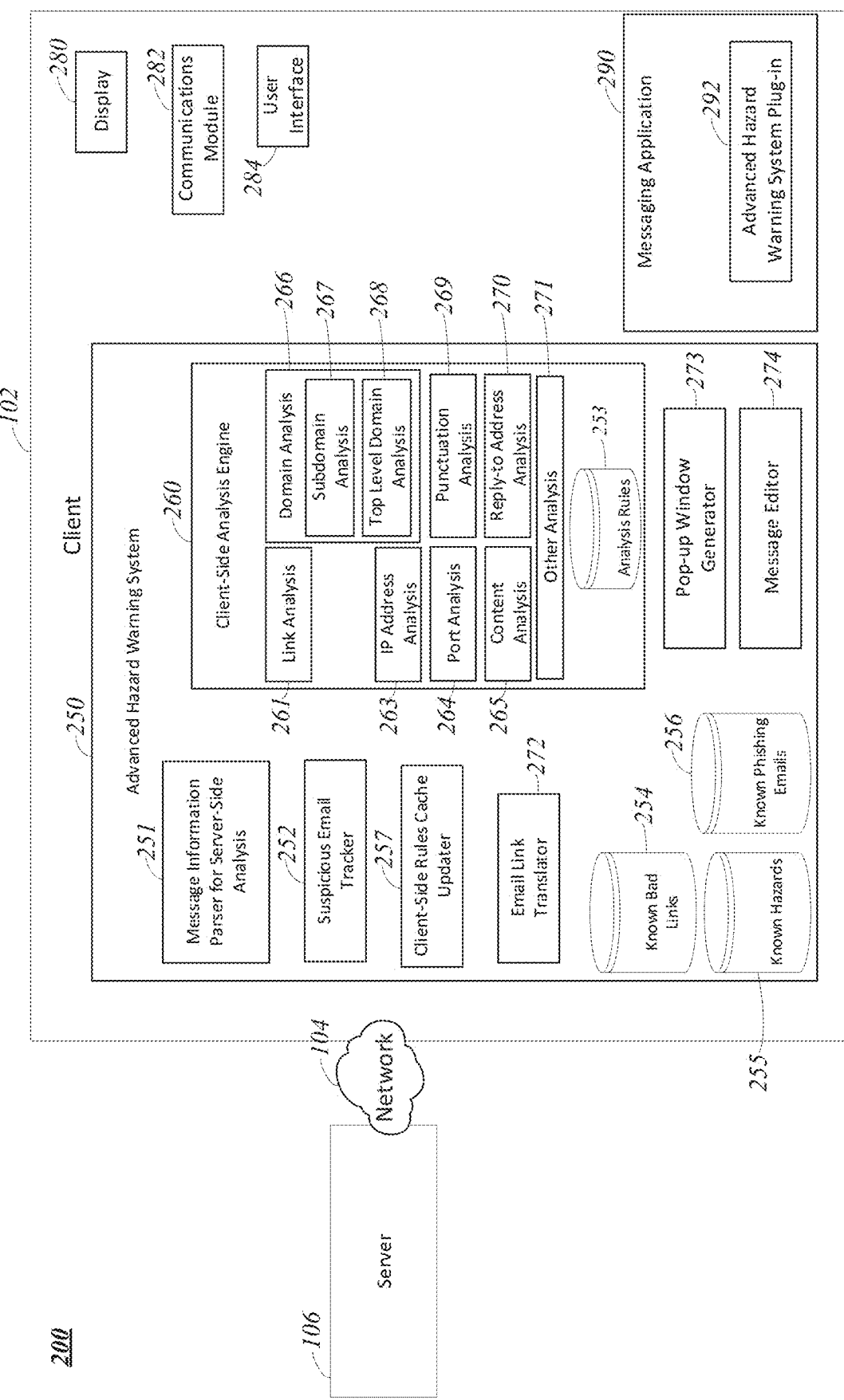

FIGS. 2A and 2B, depict in a general overview some of the architecture of an implementation of a system 200 capable of automatically discovering potential hazards in received emails and alerting users in advance of the possibility that an email they have received is a phishing email or hazardous. Both FIGS. 2A and 2B include a server 106, a network 104, and a client 102. In some embodiments, the advanced hazard warning system functionality is performed by the server 106. In some embodiments, the advanced hazard warning system functionality is performed by the client 102. In some embodiments, portions of the advanced hazard warning system functionality are performed by both the server 106 and client 102. In some embodiments, the server 106 has an analysis engine 218. In some embodiments, the client 102 has an analysis engine 260. In some embodiments, the advanced hazard warning system may send the entire email to the client 102 where the analysis engine 260 searches through the email for known hazards that may indicate that the email is a phishing email. In some embodiments, the client 102 may send some information from an email to the server 106 for analysis. In some embodiments, the client 102 maintains a cached set of rules to be used in the analysis. In some embodiments, the server 106 has a client-slide rules cache updater 216 that updates the set of cached analysis rules 253 at the client 102.

FIG. 2A depicts System 200 which includes client 102, network 104, and server 106. The server 106 includes the advanced hazard warning system 210. The advanced hazard warning system 210, includes a server-side analysis engine 218. In some embodiments, the server-side analysis engine 218 receives only portions of an email that was received by a user. In some embodiments, the server-side analysis engine 218 searches all or portions of the email for known hazards that may indicate that the email is a phishing email. The server-side analysis engine 218 may include message header analysis module 220, message metadata analysis module 222, or URL/domain analysis 224. The server-side analysis engine 218, may perform other analysis 226, such as detecting an unusual number of attachments attached to the email. The server-side analysis engine 218, further includes a storage of analysis rules 230 where all the rules and known hazards are stored by the system and can be used to identify phishing or suspicious emails, voice mails, and text messages.

The advanced hazard warning system 210, may further comprise storages of trusted domains 232 and untrusted domains 234, which store the domains that have been determined to be either trusted or untrusted respectively. The advance warning system 210 may include an interface to third party rules services 212, where the server 106 may periodically or regularly access one or more third-party services, where the third-party rules service 212 may track and report hazards. The advanced hazard warning system 210, may include a training material generator 214. The advance warning system 210 may include a client-side rules cache updater 216 that can periodically update the cached analysis rules 253 used by the client-side analysis engine 260.

In some embodiments, system 200 may include a server 106. The server 106 may be a part of a cluster of servers 106. In some embodiments, tasks performed by the server 106 may be performed by a plurality of servers. These tasks may be allocated among the cluster of servers by an application, service, daemon, routine, or other executable logic for task allocation. The server 106 may include a processor and memory.

Currently, there are many warning characteristics or known hazards that can be used to identify whether an email is a phishing email. Warning characteristics are taught to users by providing training materials that advise users to look at certain characteristics that imply that an email may be a phishing email. Warning characteristics may be incorporated into the advanced hazard warning system analysis engines 218 and 260 to use for identification of information received in an email.

The advanced hazard warning system may send some portion, aspects or traits of the email to a server-side analysis engine 218. In some embodiments, the system only sends information that does not comprise the user's privacy, as it would be an invasion of a user's privacy to send every email they receive to a server. In some embodiments, the system only sends a portion of the email, or aspects of the email, or traits of the email, or metadata of the email, to the server as sending the entire email would constitute sending large amounts of data which would increase latency. In one embodiment, the server-side analysis engine 218 focuses on general or non-personal aspects of emails to analyze whether the email is suspicious or a phishing email. In some embodiments, the system sends one or more of the email header and the metadata of the email to the server-side analysis engine 218, thereby alleviating any privacy concerns that would come from sending the full content of every email of the user to the server.

In some embodiments, the server-side analysis engine 2018 comprises one or more of a message header analysis module 220, a message metadata analysis module 222, a URL/Domain analysis module 224, and an other analysis module 226. A message header is a collection of information that documents the path that the message took to get to the user. In some embodiments, the message header analysis module 220 checks the header to see whether there is anything suspicious in the path the email took to get to the user. In some embodiments, the message header analysis module 220 checks if the sender of the email was suspicious. In some embodiments, the message header analysis module 220 checks to see if the from address in the email matches the reply-to address.

Message metadata is created and stored to provide information to help manage the message. In some embodiments, examples of metadata include when and how the message was created, the message file type and other kinds of information. By analyzing this information, the message metadata analysis module 222 the server-side advanced hazard warning system 210 can notify the client-side advanced hazard warning system 250 if there are any suspicious activities connected with the email or how the email was created. In some embodiments, the message metadata analysis module 222 will notify the client-side advanced hazard warning system 250 if the received email and known phishing emails were created in the same way.

The URL/Domain analysis 224, is where the server-side advance warning system 210 checks both the URL and the domain name for any hazards. A URL is a specific type of Uniform Resource Identifier (URI). URLs occur most commonly to reference web pages (http) but are also used for file transfer (ftp), email (mailto) database access (JDBC), and many other applications. A typical URL could have the form of http://www.example.com/index.html, which indicates a protocol (http), a hostname (www.example.com), and a file name (index.html). A domain name generally represents an internet protocol (IP) resource, such as personal computer used to access the internet, a server computer hosting a website, or the website itself or any other service communicated via the internet. This information does not contain any of the user's private information and thus can safely be sent to the server-side analysis engine 218. The server-side analysis engine 218 also includes other analysis 226, where the server analysis engine 218 would consider other any other information it has related to an email to determine whether the email is suspicious or a phishing email. In some embodiments, the server-side analysis engine 218 also comprises analysis rules 230. The security awareness system administrator may define warning characteristics or hazards for the analysis engine 218, which are based on attributes that are known to be associated with phishing emails. In one embodiment, the analysis engine 218 may compare the email, or portions or attributes of the email, to a database containing known phishing emails. In one embodiment, the analysis engine 218 may look to see if the reply-to address is the same as the sender address.

In some embodiments, the advanced hazard warning system may further comprise a trusted domain storage 232, and an untrusted domain storage 234. A trusted domain is a domain that the local system trusts to authenticate users. In other words, if a user or application is authenticated by a trusted domain, this authentication is accepted by all domains that trust the authenticating domain. The advanced hazard warning system 210, will store these trusted domains in the trusted domain storage 232. If the domain is not trusted by the local system once it has been searched, or there are suspicious features or associations with phishing emails found, the domain will be stored in the untrusted domain storage 234. The server-side analysis engine 218 can look up URLs in the storages of trusted and untrusted domains. If the URL is listed in the untrusted domain storage 234, then the advanced hazard warning system 210 will notify the client-side advanced hazard warning system 250. If the URL is listed in the trusted domain storage 232, the user may proceed with using the link and the advanced hazard warning system will not send a notification. If the link is not recognized as either a trusted or untrusted domain, then the server-side analysis engine 218 would use other analysis 216 to determine whether the domain is trustworthy.

In some embodiments, the advanced hazard warning system 210 may consist of an interface to third party rules services 212. In some embodiments, the server-side analysis engine 218 may send the content it has received to be analyzed by a third-party rules service using the interface to third party rules services 212. In some embodiments, the interface to third party rules services 212 is used to update the analysis rules 230 used by the server-side analysis engine 218. In some embodiments, the advanced hazard warning system 210 sends aspects or traits of the email to the third-party rules services that are not confidential. The server-side analysis engine 218 may send information to a third-party rules service, so that the third-party rules service can concurrently search the portion or attributes of the email for known hazards. In some embodiments, the interface to third party rules services 212 updates the server analysis rules 230 on a regular or scheduled basis.

In some embodiments, the advanced hazard warning system also consists of a training material generator 214. In some embodiments, the training material generator 214 generates educational material that can be sent to the user for the user to read real-time after they receive a suspicious email but before they open it. The advanced hazard warning system is a helper tool for employees that allows employees to be warned in real time about potential hazards in emails. The advanced hazard warning system feature may therefore keep the user from interacting with a dangerous email by warning them that it may not be safe, and at the same time the feature provides training to the user to think about these types of characteristics when they receive any future emails that comprise one or more hazards, and then they can decide how to proceed accordingly. In one embodiment, the training material generator 214 identifies teachable matters based on user actions. In one embodiment, the training material generator 214 creates one or more simulated phishing email templates based on identified teachable matters. In one embodiment, the training material generator 214 creates one or more vishing templates based on identified teachable matters. In one embodiment, the training material generator 214 creates one or more simulated smishing templates based on identified teachable matters. In one embodiment, the training material generator 214 creates training materials including one or more of posters, videos, newsletters, blog posts, podcasts, and computer-based training, based on identified teachable matters. In one embodiment, the training material generator 214 stores new templates and training materials in memory 122, so they may later be used to teach users how to avoid such phishing emails.

In some embodiments, the advanced hazard warning system 210, may include a client-side rules cache updater 216. Hazards that have been complied based on previous phishing emails can be used to identify whether an email is a phishing email. The hazards may be taught to users and can be incorporated into the advanced hazard warning system, such that notifications to the user are triggered by information received in an email comprising one or more of the known hazards. However, new hazards are discovered as new phishing emails are sent. Therefore, the server can periodically update the analysis rules storage 230 as new hazards are discovered. In addition, the client-side rules cache updater 216 may update a cached version of the rules in the analysis rules storage 253 that the client-side analysis engine 260 uses to do the email analysis locally.

FIG. 2B depicts system 200 which includes a server 106, a network 104, and a client 102. The client 102, includes an advanced hazard warning system 250, which may further comprise a client-side analysis engine 260 which analyzes received emails for hazards that may indicate the email is a phishing email. The client-side analysis engine 260 may comprise different analysis modules, such as a reply to address analysis module 270, which checks to see if the reply to email address is the same as the address that the email was sent from. The client-side analysis engine may also consist of a domain analysis module 266 wherein the domain analysis module 266 comprises a subdomain analysis module 267 and a top-level domain analysis module 268. The domain, including the subdomain and top-level domain addresses are checked to make sure they are not suspicious or used in previous phishing emails. The client-side analysis engine 260 may also comprise a punctuation analysis module 269 and a content analysis module 265, wherein the punctuation and content of the email are analyzed for hazards that may indicate the email is a phishing email. The client-side analysis engine 260 may also comprise a link analysis module 261, wherein links sent in emails are analyzed for hazards. The client-side analysis engine 260, may further comprise an IP address analysis module 263 and a port analysis module 264, wherein the IP address and port can be analyzed for hazards. The client-side analysis 260 may comprise an other analysis module 271 that can be used to analyze a received email for hazards. The client-side analysis engine 260 may include analysis rules 253 where all the rules, characteristics, and hazards that can be used to identify phishing or suspicious emails are stored by the system.

The advanced hazard warning system 250, may comprise a message information parser for server-side analysis 251, wherein the message information parser 251 selects one or more of characteristics, attributes, and content of a message to send to the server-side analysis engine 218 for analysis. The advanced hazard warning system 250 may comprise a suspicious email tracker 252, which tracks emails that have suspicious features, such as known hazards. The advanced hazard warning system 250 may also include a database of known bad links 254, a database of known phishing emails 256, and instructions for known hazards 255. In some embodiments, the advanced hazard warning system 260 notifies the user when the client-side analysis engine 260 recognizes known bad links, known phishing emails, and known hazards. The advanced hazard warning system 250 may further comprise an email link translator 272 which can translate the link when necessary, it may comprise a pop-up window generator 273 which can display a visible notification to alert the user that the email is suspicious or a phishing email, and it may comprise a message editor 274, which allows the editing of messages in the user's messaging application.

The client 102, may further comprise a display 280, a communication module 282 and a user interface 284. The client 102, may comprise a messaging application 290, which enables the messages to be sent by a user and received by a user, which comprises an advanced hazard warning system plug-in.

In some embodiments, the advanced hazard warning system plug-in 292 intercepts an email received by a user before the user opens or previews the message and sends the email to the client-side analysis engine 260. In some embodiment, the client-side analysis engine 260 searches through the email for known hazards that might indicate that the email is a phishing email. In some embodiments, the advanced hazard warning system plug-in 292 sends the entire received email is sent to the client-side analysis engine 260. In some embodiment, the advanced hazard warning system plug-in 292 sends characteristics or attributes of the received email to the client-side analysis engine 260. In some embodiment, the advanced hazard warning system plug-in 292 sends one or more of characteristics and attributes and a portion of the content of the received email to the client-side analysis engine 260.

In some embodiments, the client-side analysis engine 260 comprises analysis rules storage 253. The client-side analysis engine 260 performs different kinds of analysis such as shredding all the links and looking for indicators of urgency (number of exclamation points) to determine if the email is suspicious of being a phishing email. In some embodiments, the client-side rule analysis engine 260 may wish to ask the server side advanced hazard warning system 210 to analyze certain aspects of an email. In one embodiment, the server side advanced hazard warning system 210 may be sent the headers and the hyperlinks from a received email.

The client-side analysis engine 260 may comprise of a domain analysis module 266, which may comprise a subdomain analysis module 267 and a top-level domain analysis module 268. The client-side analysis engine 260 may also comprise a link analysis module 261 and an IP address analysis module 263. Domains are a group of computers and devices on a network that are administered as a unit with common rules and procedures. Within the internet, domains are defined by the IP address. An IP address is a unique string of numbers separated by periods that identifies each computer using the internet protocol to communicate over a network. A subdomain is an internet domain which is part of the primary domain. A top-level domain (TLD) is part of the domain name located to the right of the domain. The most common TLDs are .com, .NET, .org, .biz, .info, and .ws. These common TLDs all have certain guidelines, but are generally available to any registrant, anywhere in the world.

In some embodiments, the client-side analysis engine 260 may perform one or more analyses together. In one embodiment, the client-side analysis engine 260 analyzes the email for flags, suspicious features and similarity to known phishing emails at the same time. In one embodiment, the link analysis module 261 and the subdomain analysis module 267 are used together where an indication of suspicious links comprises counting the number of subdomains. In one embodiment, the link analysis module 261 and the subdomain analysis module 267 are used together to analyze the number of links inside the body of the email, as the subdomain analysis engine 267 is looking for subdomain splitting. In one embodiment, two or more of the different kind of analysis are used in making sure the IP address belongs to a domain. In another embodiment, a hazard is recognized by the top-level domain analysis module 268 when a top-level domain (TLD) is not found at the end of the overall host name (the URL that backs the hyperlink that is in the mail). The client-side analysis engine 260 may further comprise a punctuation analysis module 269 and a content analysis module 265. In both these two types of analysis the punctuation of the email and the actual content are analyzed. In some embodiments, the client-side analysis engine 260 receives the entire email and the literal content of the email can be examined. In some embodiment, the punctuation analysis module 269 finds excessive use of exclamation marks in formal emails. The client-side engine may comprise a reply-to address analysis module 270, which raises a hazard if the reply-to address does not correspond to the email address of the sender. In some embodiments, the client-side analysis engine 260 may include a port analysis module 264. A port is an endpoint of communication in an operating system, which in software is a logical construct that identifies a specific process or a type of network service. The port analysis module 264 analyzes the specific process or the type of the network service that the email was sent from, to make sure the email is not flagged, suspicious or a phishing email. In some embodiments, the client-side analysis engine 260 comprises an other analysis module 271, which may become pertinent if new kinds of phishing emails are created.

In some embodiments, the advanced hazard warning system 250, includes a message information parser for server-side analysis 251. In the present invention, in some embodiments the client-side advanced hazard warning system 250 receives a full email from the advanced hazard warning system plug-in 292 within the user's messaging application 290. The message information parser for server-side analysis 251 converts the format of the email to one or more internal formats of the server-side analysis engine 118. In some embodiments, the header of received email is parsed for the server-side analysis engine 118. In some embodiments, metadata of the received email is parsed for the server-side analysis engine 118. In some embodiments, URL and domain information of the received email is parsed for the server-side analysis engine 118. In some embodiments, some or all the contents of the email are hashed for the server-side analysis engine 118. Once the parsed information is received, it can be analyzed by the server side analysis engine 218.

In some embodiments, the advanced hazard warning system 250 includes a suspicious email tracker 252. Where the client-side analysis engine 260 of the advanced hazard warning system 250, identifies an email as suspicious, the suspicious email tracker 252, will track the email to find the identity of the sender. Emails arrive in inboxes with a "receipt" which contains a lot of information about the sender. To find the sender's identity, the email tracker would only need to retrieve the IP address, however the suspicious email tracker may also retain other information from the email header, for example the originating domain, the reply-to address and the email client, for example thunderbird.

In some embodiments, the advanced hazard warning system 250, includes a client-side rules cache updater 257. In some embodiments, the advanced hazard warning system 250 also includes a storage for known bad links 254, a storage for known phishing emails 256, and a storage for known hazards 255. In some embodiments, the advanced hazard warning system includes a storage for analysis rules 253. As new threats are discovered by the server, the server can update one or more of the client storages. In some embodiments, the client storages are updated periodically. In some embodiments, the client updates the client storages when new threats are discovered. These client storages have been compiled based on previously compiled information about links, hazards and phishing emails. In some embodiments, when the advance hazard system comes across one or more of these bad links, hazards or phishing emails, it will notify the user that the link or phishing email should not be opened. In some embodiments, the advanced hazard warning system will not block the user from interacting with the email, instead the system notifies the user, and the user can then choose to open an email or link.

In some embodiments, the advanced hazard warning system 250 comprises a pop-up window generator 273, a message editor 274 and an email link translator 272. A pop-up is a graphical user interface (GUI) display area, usually a small window that suddenly appears ("pops up") in the foreground of the visual interface. In some embodiments, the pop-up window generator 273 generate one or more pop-up windows to inform the user that the email they have displayed and/or opened is suspected to be a phishing email. In some embodiments, the pop-up window presents a preview of the email with hazards in the email flagged so that the user can see them.

In some embodiments, the advanced hazard warning system 260 comprises a message editor 274. The message editor can be used to edit the original received mail to warn the user that the email is suspicious or a phishing email. In some embodiments, the message editor 274 inserts a block or banner of text between the header and the body of the original email. In some embodiments, the message editor 274 edits the text in the body of the email to highlight the hazards that are present. In some embodiments, the message editor 274 edits the text in the body of the email to add learning content for the user. In some embodiments, the advanced hazard warning system 260 comprises an email link translator 272, operable to translate a link in the email, whenever it is necessary.

In some embodiments, client 102, include a display 280. A display is a computer output surface and projecting mechanism that shows text and often graphic images to the computer user, using a cathode ray tube (CRT), liquid crystal display (LCD), light-emitting diode, gas plasma, or other image projection technology. The display is usually considered to include the screen or projection surface and the device that produces the information on the screen. Here the display will notify the user through different means, if the email is suspicious or a phishing email.

In some embodiments, client 102 includes a communications module 282. The communications module 282 is operable to connect the client 102 to the network 104 and to the server 106, among other functions. In some embodiments, client 102 includes a user interface 284. A user interface is a point of interaction between a computer and humans; it includes any number of modalities of interaction (such as graphics, sound, position, movement, etc.) where data is transferred between the user and the computer system. The user interface is the way through which a user interacts with an application or a website. The user interface permits the user to interact with the email and the advanced hazard warning system, thus allowing the user to extract the information it needs from the computer.

In some embodiments, Client 102 includes a messaging application 290, which further includes an advanced hazard warning system plug-in 292.

Figure 3A:
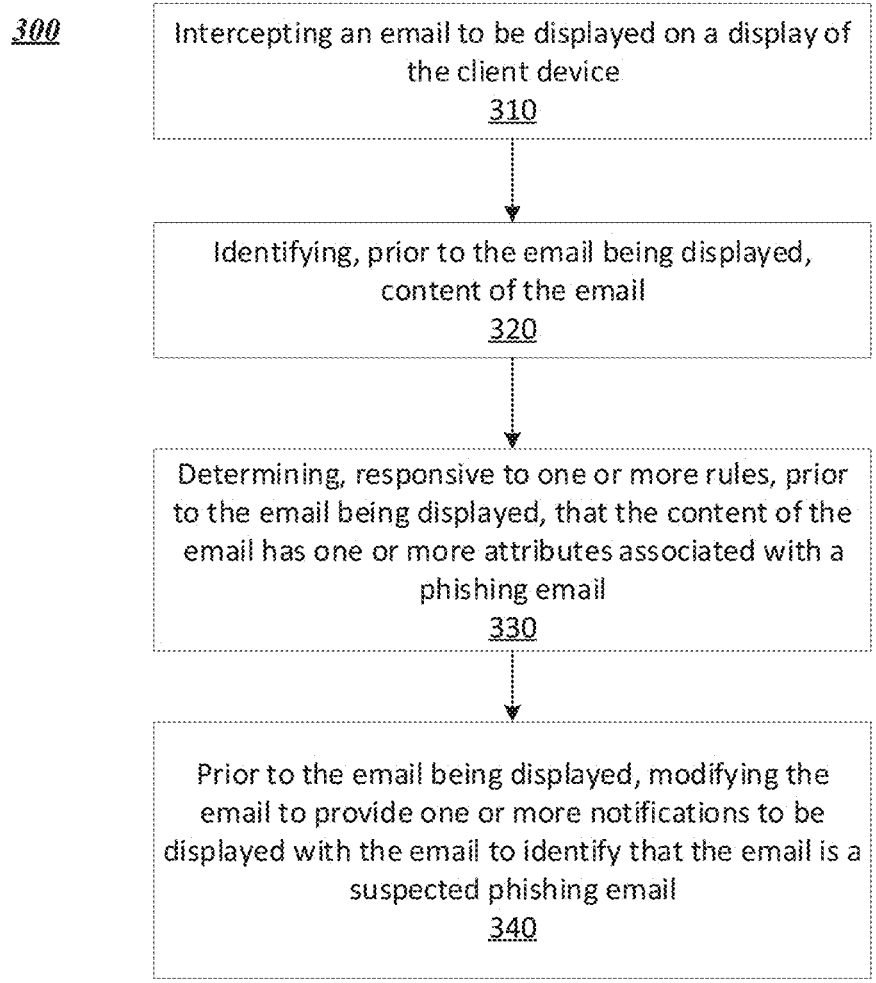
FIG. 3A depicts an implementation of a method for intercepting and modifying an email prior to the email being displayed, to provide one or more notifications displayed with the email identifying the email as a suspected phishing email.

Referring to FIG. 3A in a general overview, FIG. 3A depicts an implementation of a method 300 for determining an email has attributes associated with a phishing email prior to displaying the email and modifying the email to display notifications that identify the email as a suspected phishing email. In step 310, the advanced hazard warning system intercepts an email, by an agent executing on a client device, to be displayed on a display of the client device. In step 320, the agent identifies the content of the email prior to the email being displayed. In step 330, the agent determines in response to one or more rules of the agent, prior to the email being displayed, that the content of the email has one or more attributes associated with a phishing email. In Step 340, the agent modifies the email, prior to the email being displayed, to identify that the email is a suspected phishing email.

In Step 310, the advanced hazard warning system plug-in 292 in the messaging application 290 on the client device 102 intercepts an email to be displayed on a display of the client device. In one embodiment, advanced hazard warning system plug-in 292 detects a process that the messaging application 290 instantiates when a user clicks on or hovers over an email and pauses the execution of the process. In one embodiment, advanced hazard warning system plug-in 292 detects a process that the messaging application 290 instantiates when a user clicks on or hovers over an email and stops the execution of the process. Once the process which would display the email to the user is paused or stopped, the advanced hazard warning system plug-in 292 extracts content from the email for analysis. In one embodiment, the advanced hazard warning system plug-in 292 extracts the entire email for analysis. In some embodiments, the advanced hazard warning system plug-in 292 extracts parts of the email, for example the email header, subject, title, sender, or parts of the body of the email. In some embodiments, the advanced hazard warning system plug-in 292 extracts attributes of the email, for example count of words, count of specific punctuation such as exclamation points, or counts of upper-case letters. In some embodiments, the advanced hazard warning system plug-in 292 extracts any links that are present in the email. In some embodiments, the advanced hazard warning system plug-in 292 extracts IP address and port that are present in the email. In some embodiments, the advanced hazard warning system plug-in 292 extracts reply-to information from the email. In some embodiments, the advanced hazard warning system plug-in 292 extracts sent-from information from the email. In some embodiments, the advanced hazard warning system plug-in 292 extracts domain information from the email.

In Step 320, the client-side analysis engine 260 identifies, prior to the email being displayed, content of the email. In some embodiments, the entire email is sent to the client-side analysis engine 260, since there are no privacy concerns. In some embodiment, the client-side analysis engine 260 has different analysis modules which analyze different content of the email. In some embodiments, the domain information from the email is identified and processed by a domain analysis module 266 which further includes subdomain analysis 267 and top-level domain analysis 267. In some embodiments, the link information from the email is identified and processed by a link analysis module 261. In some embodiments, the IP address information from the email is identified and processed by an IP address analysis module 263. In some embodiments, the port information from the email is identified and processed by a port analysis module 264. In some embodiments, content from the email is identified and processed by one or more of a content analysis module 265 and a punctuation analysis module 269. In some embodiments, content from the email is identified and process by a reply-to address analysis module 270. Other analysis may be performed as well by the other f analysis module 271. For the client-side analysis engine 260 to be able to do each of these analyses the advanced hazard warning system 260 identifies the content, domain, the IP address, links as well as other sections of the email, that can later be analyzed.

In Step 330 the client-side analysis engine 260 determines in response to one or analysis rules 253 of the advanced hazard warning system 250, prior to the email being displayed, that the content of the email has one or more attributes associated with a phishing email. The client-side analysis engine 260 analyzes the entire email for flags or indications of a phishing email. The client-side analysis engine 260, includes analysis rules 253, which have been compiled based on attributes that are known to be associated with phishing emails. In some embodiments, these rules are congruent with learning modules and training materials that are provided to teach users. The characteristics and attributes in the analysis rules 253 are incorporated into the advanced hazard warning system 250 and the client-side analysis engine 260. In some embodiments, when content of the email is analyzed, and one or more characteristics or attribute is identified, notifications to the user are generated.

In Step 340, the email is modified by the advanced hazard warning system 250 prior to the email being displayed, to provide one or more notifications to be displayed with the email to identify that the email is a suspected phishing email. Once the advanced hazard warning system 250 has identified that the email is a suspected phishing email, the system will modify one of the email or it's preview, in order to notify the user that the email is suspicious and may be a phishing email. In an embodiment, the advanced hazard warning system 250 changes the email that the user sees by modifying the underlying code of the email. In some embodiments, when the email has been identified as a suspected phishing email, the message editor 274 modifies the body of the email to add notifications to warn the user. In some embodiments, the message editor 274 adds warning flags to the body of the email. In some embodiments, the message editor 274 changes aspects of the font of some text in the body of the email. In some embodiments, the message editor adds or removes text from the body of the email. In some embodiments, pop-up window generator 273 generates a pop-up window that is displayed when the user clicks on or hovers over an email that has been identified as a suspected phishing email. In some embodiments, the message editor 274 creates an edited copy of the suspected phishing email and the pop-up window generator 273 displays the edited copy of the suspected phishing email. In some embodiments, the pop-up window generator 273 creates a pop-up window that comprises selectable actions that enable the user to one or more of alert the IT department about the suspected phishing email, close the suspected phishing email, and delete the suspected phishing email. In some embodiments, the pop-up window comprises one or more of training for the user on phishing emails and links to access training on phishing emails. In some embodiments, the pop-up window comprises information or statistics about the identified hazards in the email. In some embodiments, the email link translator 272 translates the links contained in the email.

Figure 3B:
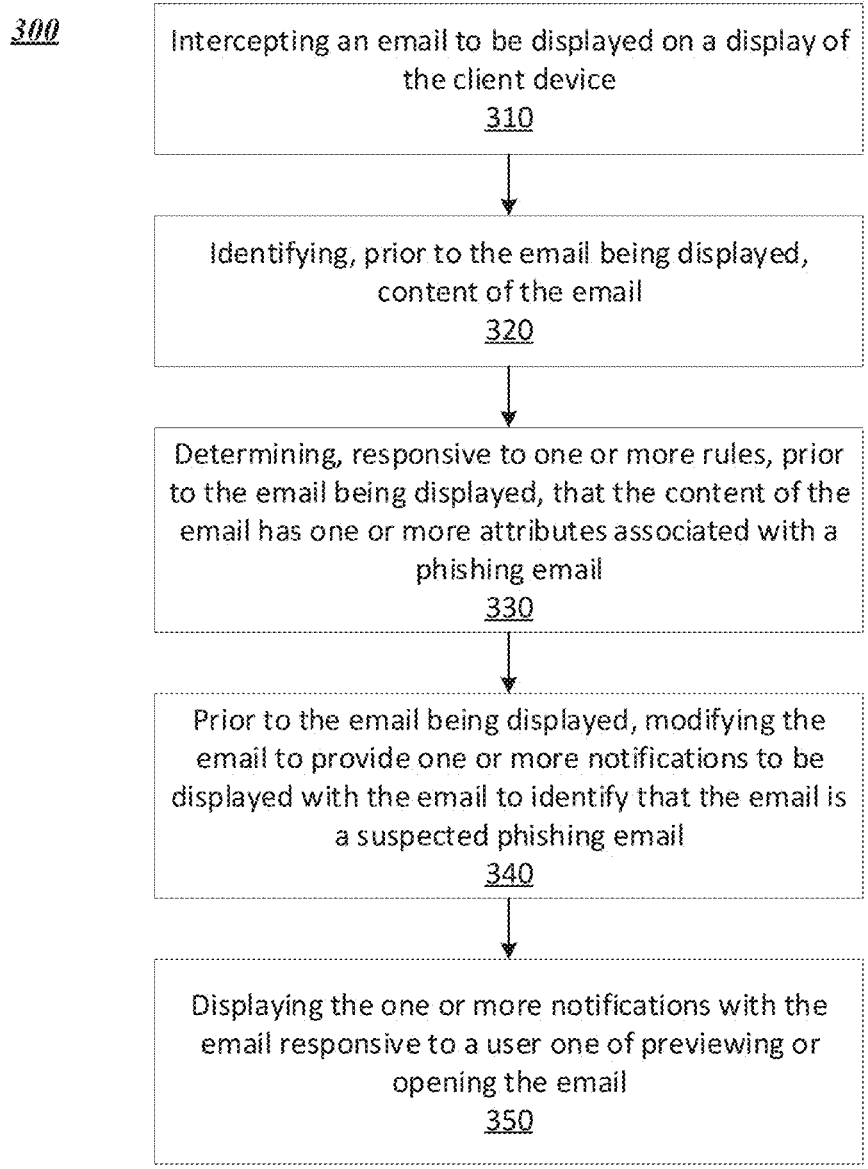
FIG. 3B depicts an implementation of a method for intercepting and modifying an email prior to the email being displayed where the one or more of the notifications are displayed with the email responsive to a user one of previewing or opening the email.

Referring to FIG. 3B in a general overview, FIG. 3B depicts an implementation of a method 350 for determining an email is a phishing email prior to displaying the email. In Step 310, the advanced hazard warning system intercepts an email, by an agent executing on a client device, to be displayed on a display of the client device. In step 320, the agent identifies the content of the email prior to the email being displayed. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email. In Step 350, one or more notifications are displayed with the email responsive to a user one of previewing or opening the email.

In Step 350, one or more notifications are displayed with the email responsive to a user one of previewing or opening the email. The message editor 274, pop-up window generator 273, and email link translator 272 of the advanced hazard warning system 250 may create notifications highlighting potential hazards identified in the email. In some embodiments, the display 280 on the client 102 displays the notifications in a preview screen in a user's inbox such that the user is displayed a modified copy of the email with the hazards highlighted. In some embodiments, the user may need to interact with the user interface 284 to see the warning notification. In some embodiments, the user would not need to perform any action to see warning notifications. In another embodiment, the warning notifications are displayed within a box inserted between the header and the body of the suspected phishing email. In other embodiments, the warning box can be added across multiple users and email services. In another embodiment, the display 280 shows the notification to the user when the user hovers over part of the suspected phishing email.

Figure 3C:
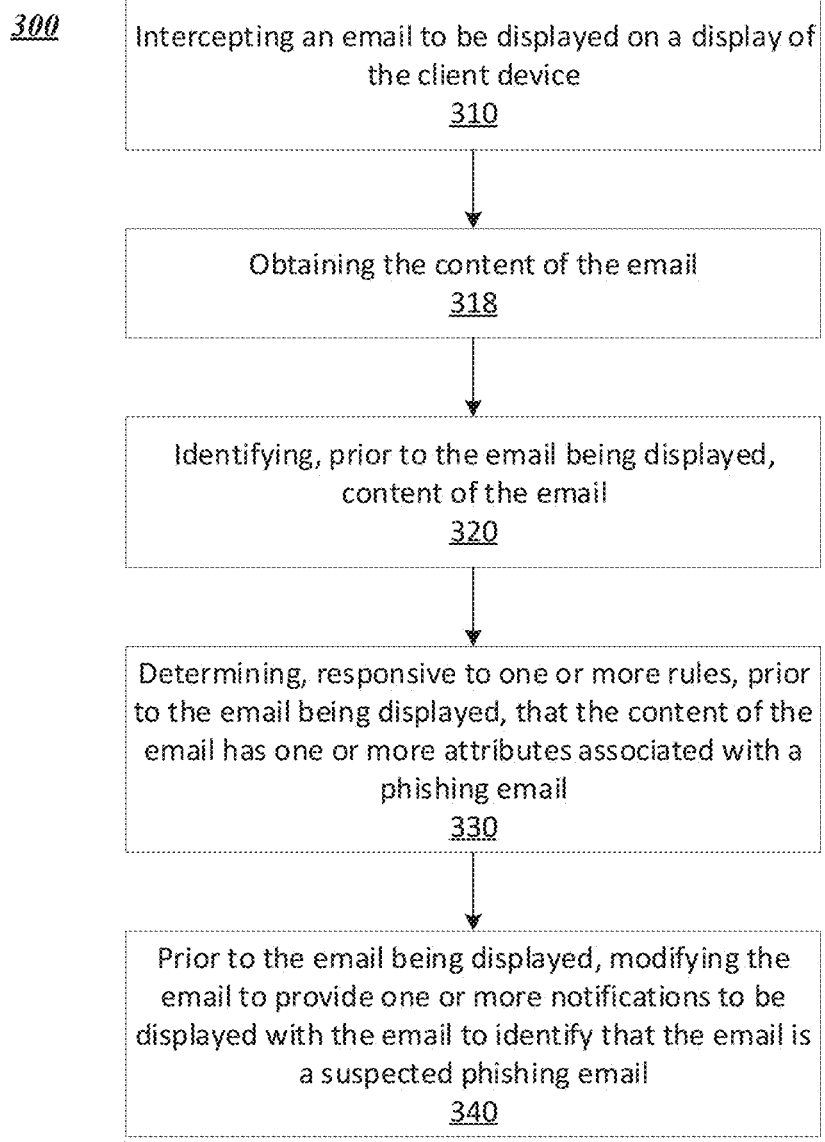
FIG. 3C depicts an implementation of a method for intercepting and modifying an email prior to the email being displayed, wherein the method comprises obtaining the content of the email.

Referring to FIG. 3C in a general overview, FIG. 3C depicts an implementation of a method 350 for determining an email is a phishing email prior to displaying the email. In step 310, the advanced hazard warning system intercepts an email, by an agent executing on a client device, to be displayed on a display of the client device. In step 318, the agent obtains the content of the email. In step 320, the agent identifies the content of the email prior to the email being displayed. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email.

In step 318, the agent obtains the content of the email. Using the advanced hazard warning system plug-in 292 in the user's messaging application 290 (e.g., Outlook, Gmail), the advanced hazard warning system 250 obtains content from the email (e.g., parts of the email-header, subject title, sender, parts of body, count of words, count of punctuation, as well as other sections).

Figure 3D:
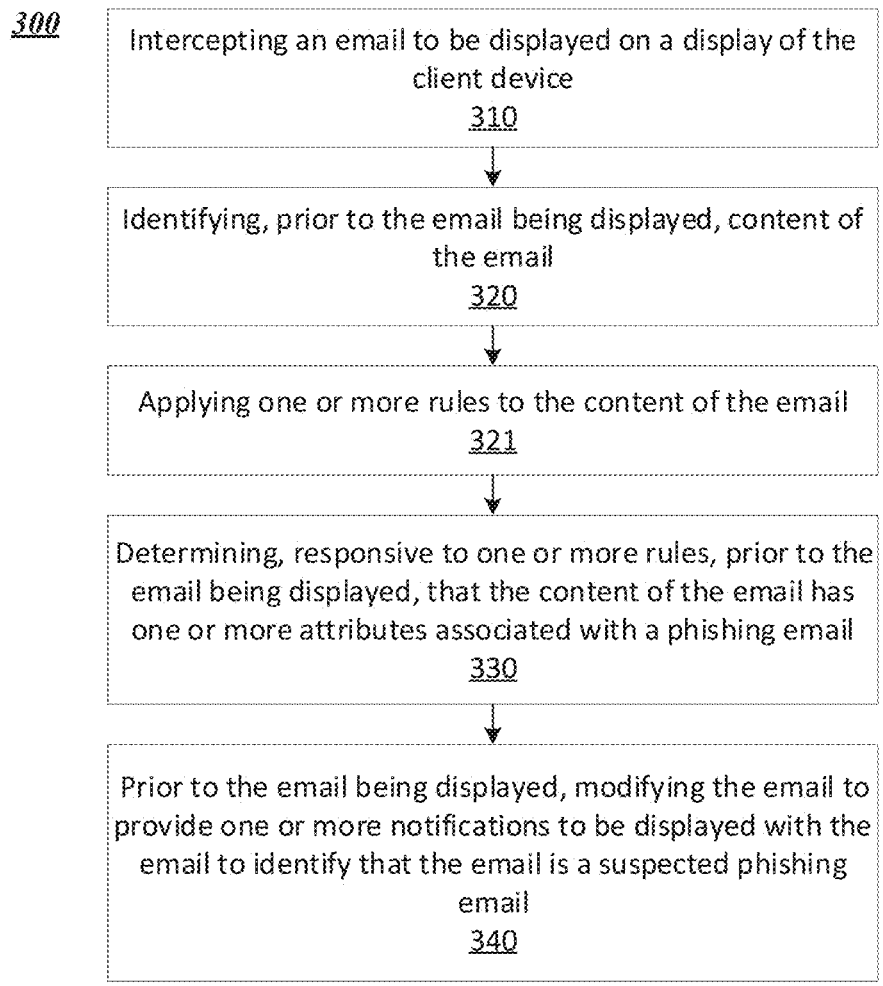
FIG. 3D depicts an implementation of a method for intercepting and modifying an email wherein the method comprises applying one or more rules to the content of the email.

Referring to FIG. 3D in a general overview, FIG. 3D depicts an implementation of a method 350 for determining an email is a phishing email prior to displaying the email. In step 310, the advanced hazard warning system intercepts an email to be displayed on a display of the client device. In step 320, the advanced hazard warning system identifies the content of the email prior to the email being displayed. In step 321, one or more rules are applied to the content of the email. In step 330, in response to one or more rules, prior to the email being displayed, the advanced hazard warning system determines that the content of the email has one or more attributes associated with a phishing email. In step 340, the advanced hazard warning system modifies the email, prior to the email being displayed, to identify that the email is a suspected phishing email.

In step 321, one or more of the rules are applied to the content of the email. The client-side analysis engine 260, includes analysis rules 253 and different types of analysis modules that can analyze the email from different aspects. The email can be analyzed by one or more of the analysis modules, either working separately or together. In an embodiment, both the link analysis module 261 and domain analysis module 266 are used when the client-side analysis of suspicious links comprises counting the number of subdomains. In some embodiments, both the link analysis module 261 and domain analysis module 266 are used wherein the link analysis module 261 is used to analyze links inside the body of the email and the subdomain analysis module 267 is looking for subdomain splitting. In one embodiment, the subdomain analysis module 267 separates the subdomains and counts them. If the number of subdomains is too high this might be an indication that the email is a suspected phishing email. In one embodiment, IP address analysis module 263, and domain analysis module 266 work together to analyze whether the IP address belongs to a domain. In some embodiments, top-level domain analysis module 268 indicates when a top-level domain (TLD) is found in a place that is not at the end of the overall host name (the URL that backs the hyperlink that is in the mail.)

Figure 3E:
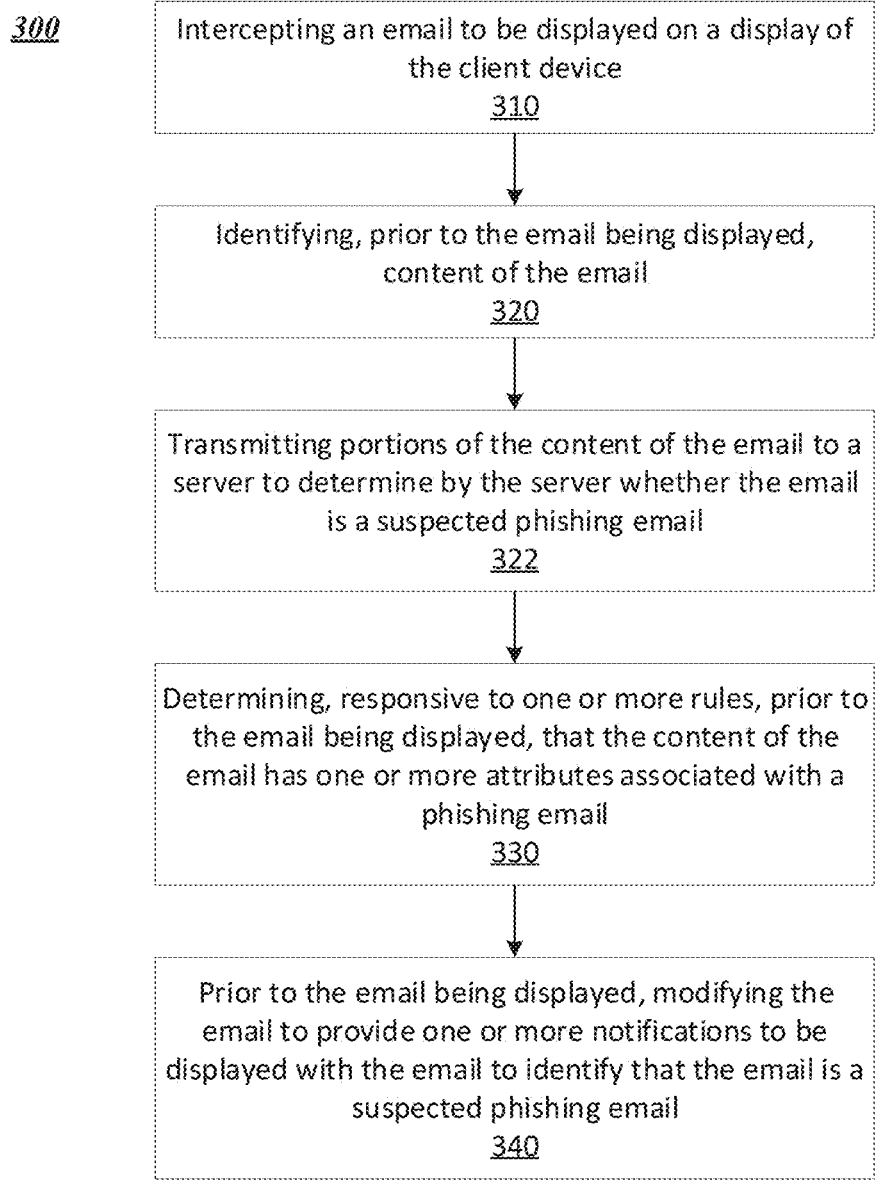
FIG. 3E depicts an implementation of a method for intercepting and modifying an email wherein the method comprises transmitting portions of the content of the email to a server for the server to determine whether the email is a suspected phishing email.

Referring to FIG. 3E in a general overview, FIG. 3E depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 322, the agent transmits portions of the content of the email to a server to determine by the server whether the email is a suspected phishing email. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email.

In step 322, the advanced hazard warning system 250 transmits portions of the content of the email to a server 106 to determine by the server whether the email is a suspected phishing email. In some embodiments, the message information parser for server-side analysis 251 extracts portions of the content of the email to send to the server 106. In some embodiments, the message information parser for server-side analysis 251 extracts portions of the header of the email to send to the server 106. In some embodiments, the message information parser for server-side analysis 251 extracts attributes or characteristics of the content of the email to send to the server 106. In some embodiments, the message information parser for server-side analysis 251 extracts links from the email to send to the server 106. In some embodiments, the message information parser for server-side analysis 251 extracts metadata related to the email to send to the server 106. In some embodiments, the advanced hazard warning system 250 sends message information to the server 106. In some embodiments, the advanced hazard warning system 250 sends non-confidential parts of the email, e.g., headers, and hyperlinks to the server 106. In some embodiments, the server 106 has a server-side analysis engine 218, and analysis rules 230 compiled based on attributes that are known to be associated with phishing emails. In some embodiments, the server-side analysis engine 218 has a message header analysis module 220, a message metadata analysis module 222, a URL/domain analysis module 224 and other analysis module 226.

Figure 3F:
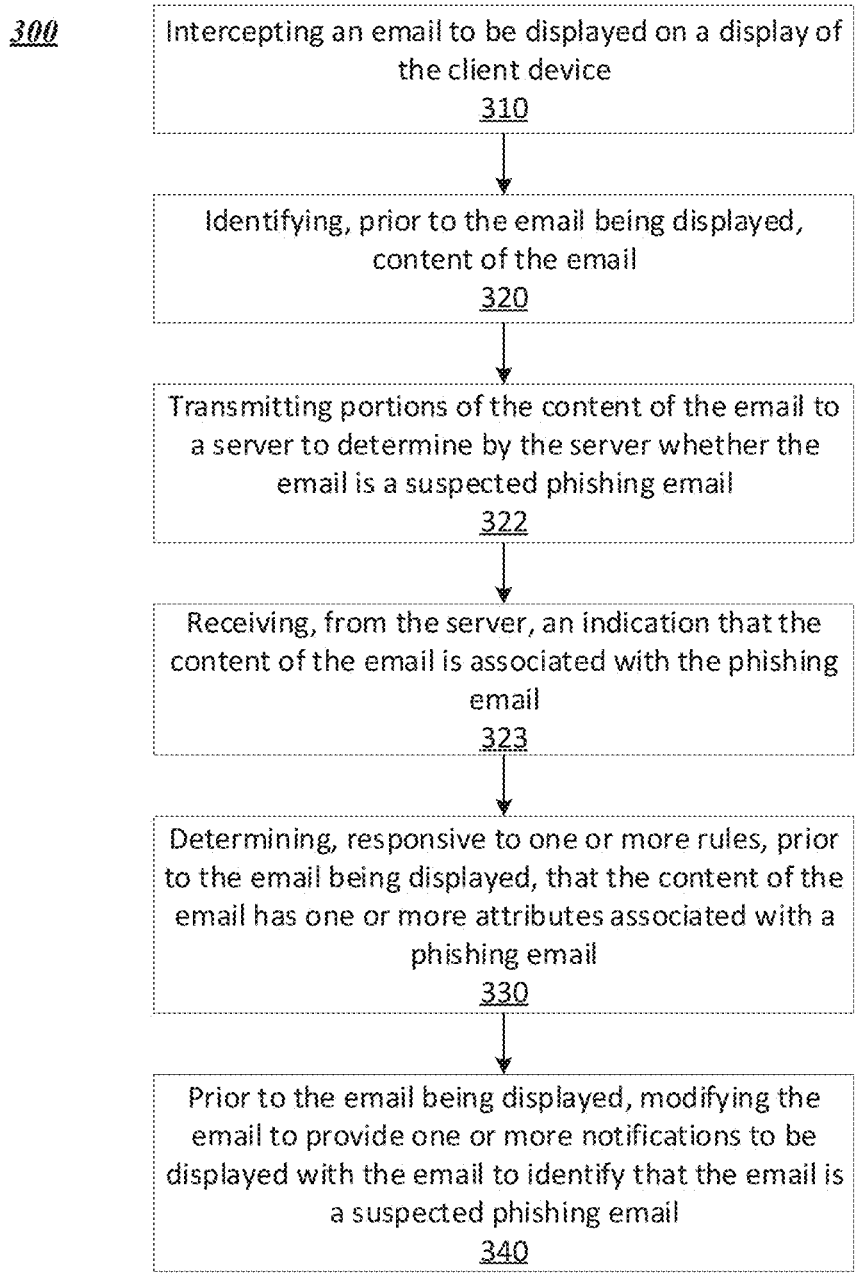
FIG. 3F depicts an implementation of a method for intercepting and modifying an email wherein the method comprises transmitting portions of the content of the email to a server and the server determining whether the email is suspected phishing email and the server notifying the client that the content of the email is associated with a phishing email.

Referring to FIG. 3F in a general overview, FIG. 3F depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 322, the agent transmits portions of the content of the email to a server to determine by the server whether the email is a suspected phishing email. In step 323, the advanced hazard warning system receives an indication from the server that the email is associated with a phishing email. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email.

In step 323, the advanced hazard warning system 250 receives an indication from the server 106 that the email is associated with a phishing email. In some embodiments, the server-side analysis engine 218 conducts its analysis, and once it has found an indication that the email is a suspected phishing email, it notifies the server-side advanced hazard warning system 210 which notifies the client-side advanced hazard warning system 250. The server-side advanced hazard warning system 210 may include a list of compiled trusted domains 232 and untrusted domains 234. In some embodiments, the server-side analysis engine 218 receives the message information including domain information, and it may determine if the domain is a known trusted domain or untrusted domains. If the domain is an untrusted domain, then the server-side advanced hazard warning system 210 will notify the client-side advanced hazard warning system 250 so it can notify the user. In some embodiments, the server-side analysis engine 218 determines that the content of the email is associated with a suspected phishing email based on one or more of message header information, message metadata, URL information, or other content from the email message that was received from the user.

Referring to FIG. 3G in a general overview, FIG. 3G depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 322, the agent transmits portions of the content of the email to a server to determine by the server whether the email is a suspected phishing email. In step 324, the advanced hazard warning system receives from the server, one of identification of or information on the one or more attributes of the content of the email associated with the phishing email. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email.

In step 324, the advanced hazard warning system receives from the server, one of identification of or information on the one or more attributes of the content of the email associated with the phishing email. The server-side analysis engine 218, which has its own set of analysis rules 230, and analyzes different aspects of the message information that have been sent to it by the advanced hazard warning system 250, using message header analysis module 220, message metadata analysis module 222, URL/domain analysis module 224, as well as other types of analysis module 226. Each of these parts of the message information can either be analyzed independently or with other parts of the message information of the email. In one embodiment, the server-side analysis engine analyzes message information to determine whether the sent address matches the reply-to address. In some embodiments, the server-side analysis engine 218 sends to the client-side advanced hazard warning system 250 one of identification of or information on the one or more attributes of the message information that it has determined are associated with a phishing email, which the client-side analysis engine can use as an input to the client-side analysis of the email.

Figure 3H:
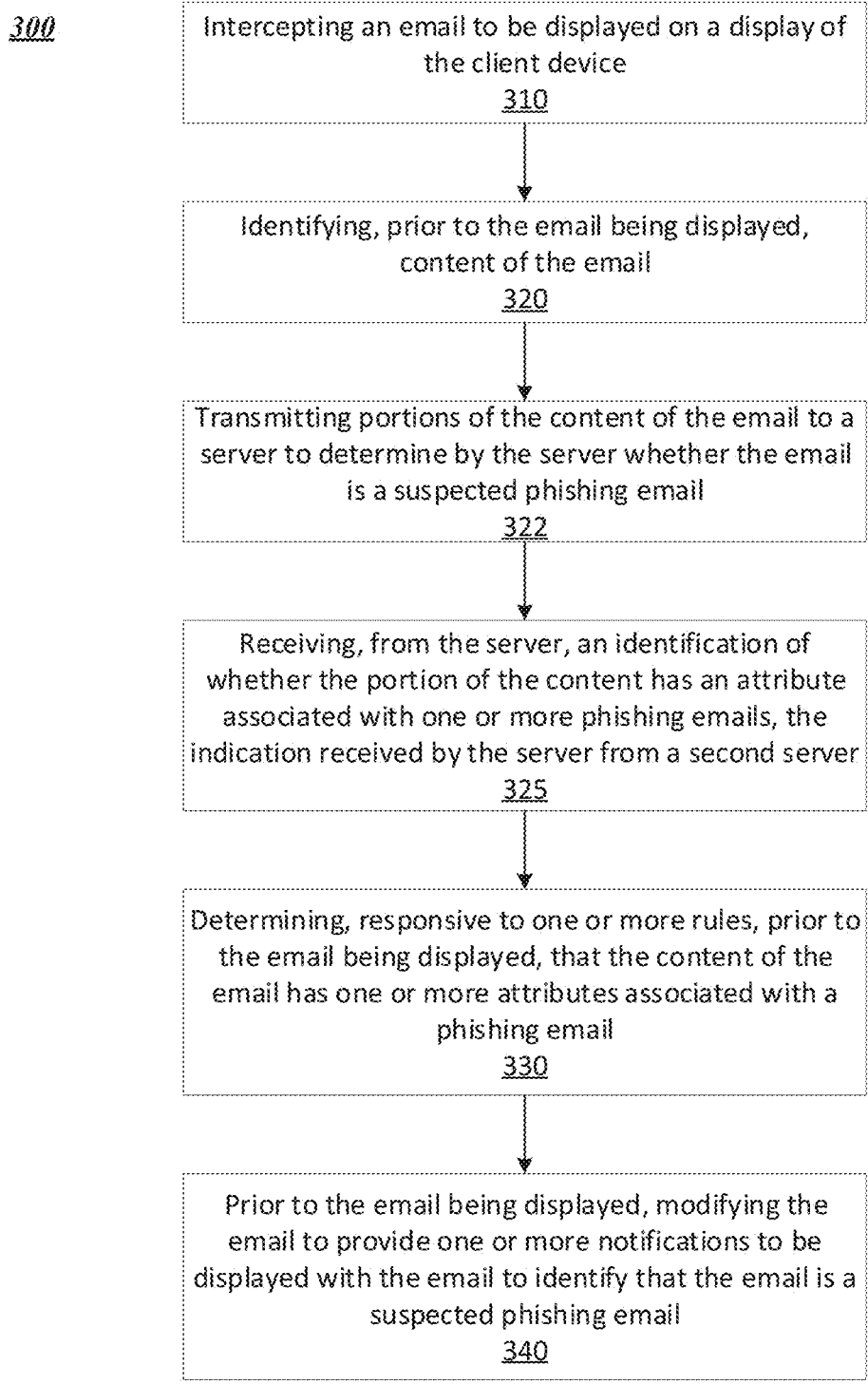
FIG. 3H depicts an implementation of a method for intercepting and modifying an email wherein the method comprises transmitting portions of the content of the email to a server, and the server communicating with a second server to identify whether the portions of the content have one or more attributes associated with one or more phishing emails.

Referring to FIG. 3H in a general overview, FIG. 3H depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 322, the agent transmits portions of the content of the email to a server to determine by the server whether the email is a suspected phishing email. In step 325, the advanced hazard warning system receives an identification by the server of whether the portion of the content has an attribute associated with one or more phishing emails, the indication received by the server from a second server. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email.

In step 325, the advanced hazard warning system receives an identification by the server of whether the portion of the content has an attribute associated with one or more phishing emails, the indication received by the server from a second server. In some embodiments, the advanced hazard warning system 210 server-side analysis engine 218 may send some or all of the message content received from the client-side analysis engine 260 to a third-party service. In some embodiments, the third-party service, does not receive confidential information due to privacy concerns. The third-party service has a set of rules and sends an indication to the server-side analysis engine 218 if it believes that the message content indicates that the email is a suspected phishing email. The server-side analysis engine 218 forwards this indication to the client-side analysis engine 260. In some embodiments, the server-side advanced hazard warning system 210 receives updated rules from a third-party service and uses these rules to update analysis rules 230.

Figure 3I:
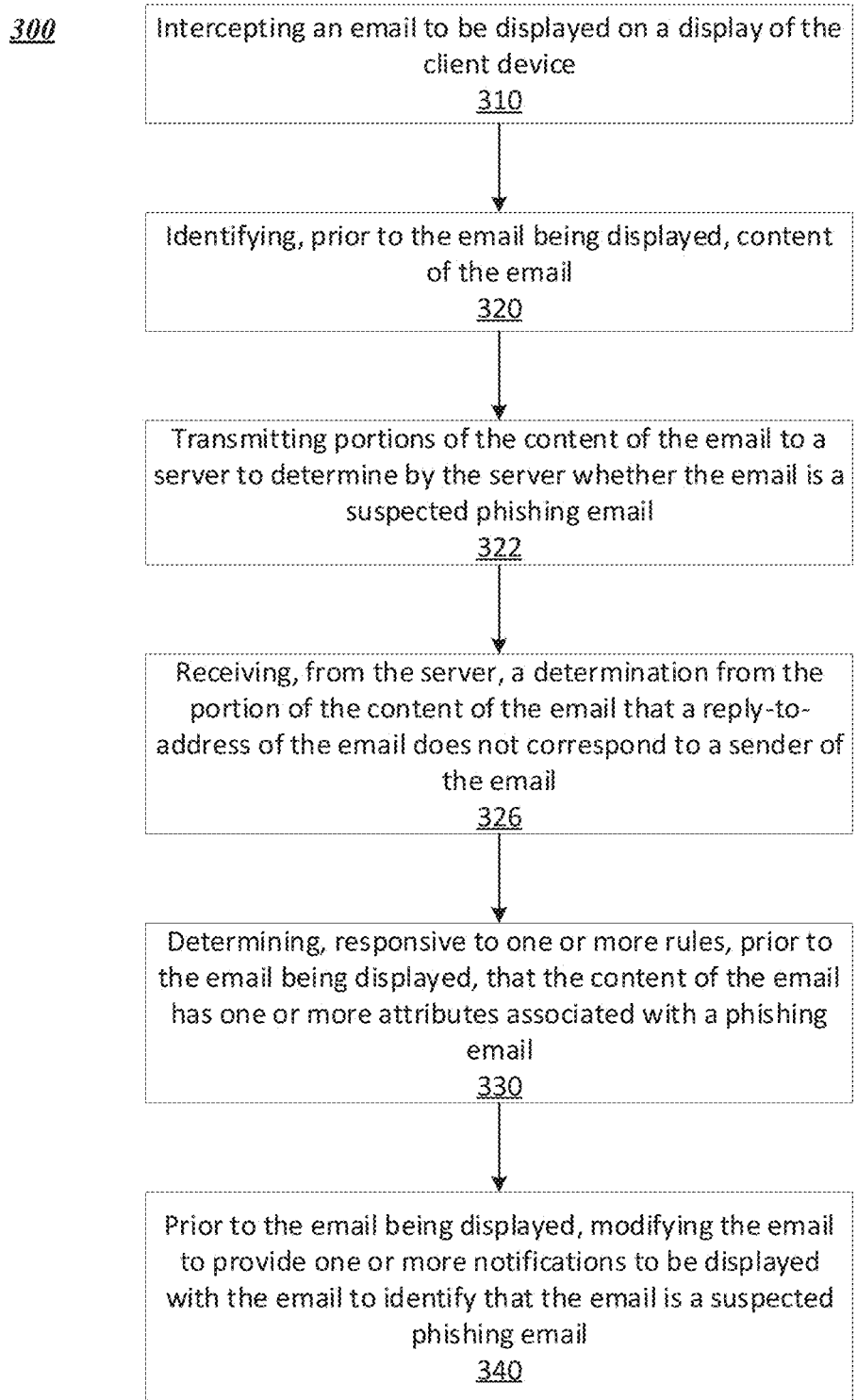
FIG. 3I depicts an implementation of a method for intercepting and modifying an email wherein the method comprises transmitting portions of the content of the email to a server and the server determining whether the email is a suspected phishing email by determining from the portions of the content of the email that a reply-to-address of the email does not correspond to a sender of the email.

Referring to FIG. 3I in a general overview, FIG. 3I depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 322, the agent transmits portions of the content of the email to a server to determine by the server whether the email is a suspected phishing email. In step 326, the advanced hazard warning system receives a determination from the server that the portion of the email that a reply-to-address of the email does not correspond to a sender of the email. In step 330, the agent determines in response to one or more rules of the agent, prior to the email being displayed, that the content of the email has one or more attributes associated with a phishing email. In Step 340, the agent modifies the email, prior to the email being displayed, to identify that the email is a suspected phishing email.

Figure 3J:
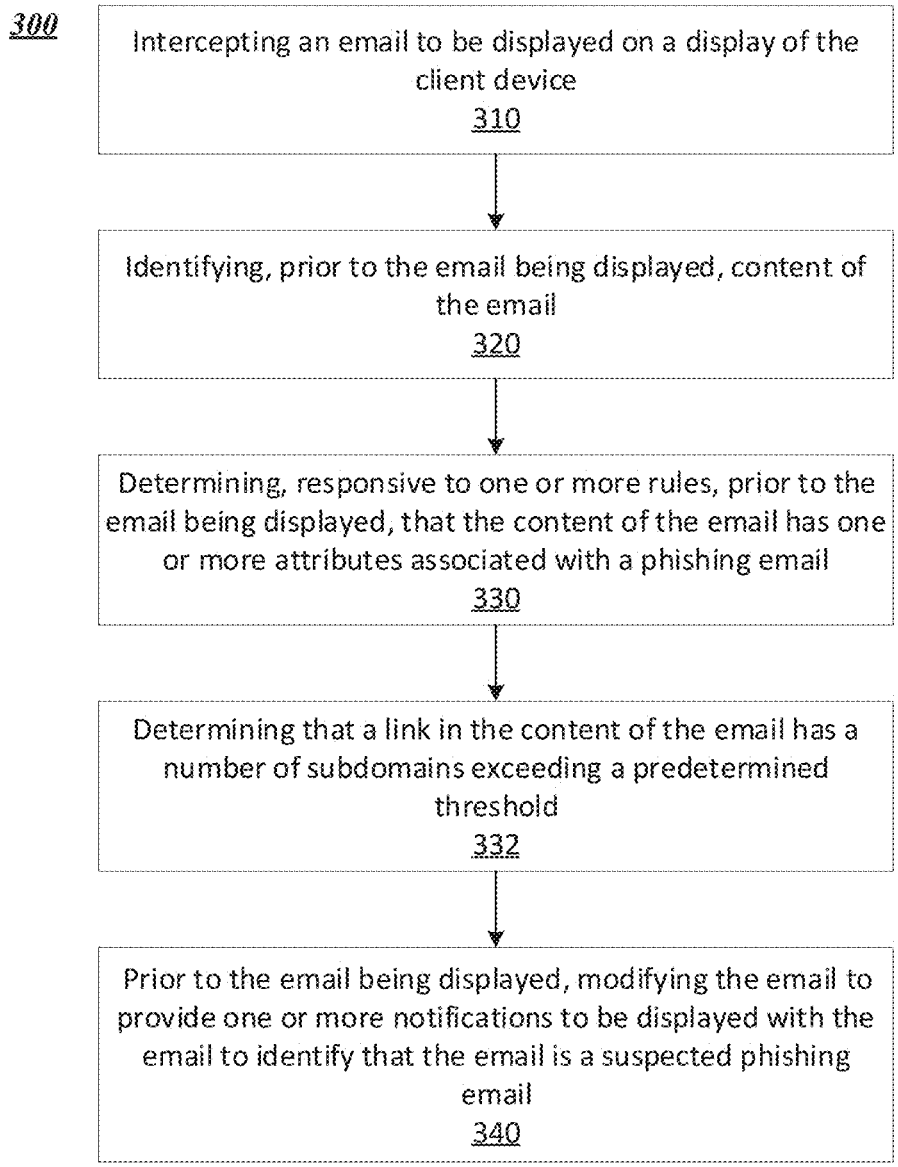
FIG. 3J depicts an implementation of a method for intercepting and modifying an email wherein the method comprises determining that a link in the content of an email has a number of subdomains exceeding a predetermined threshold.

Referring to FIG. 3J in a general overview, FIG. 3J depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 330, the agent determines in response to one or more rules of the agent, prior to the email being displayed, that the content of the email has one or more attributes associated with a phishing email. In step 332, the agent determines that a link in the context of the email has a number of subdomains exceeding a predetermined threshold. In step 340, the agent modifies the email, prior to the email being displayed, to identify that the email is a suspected phishing email.

Figure 3K:
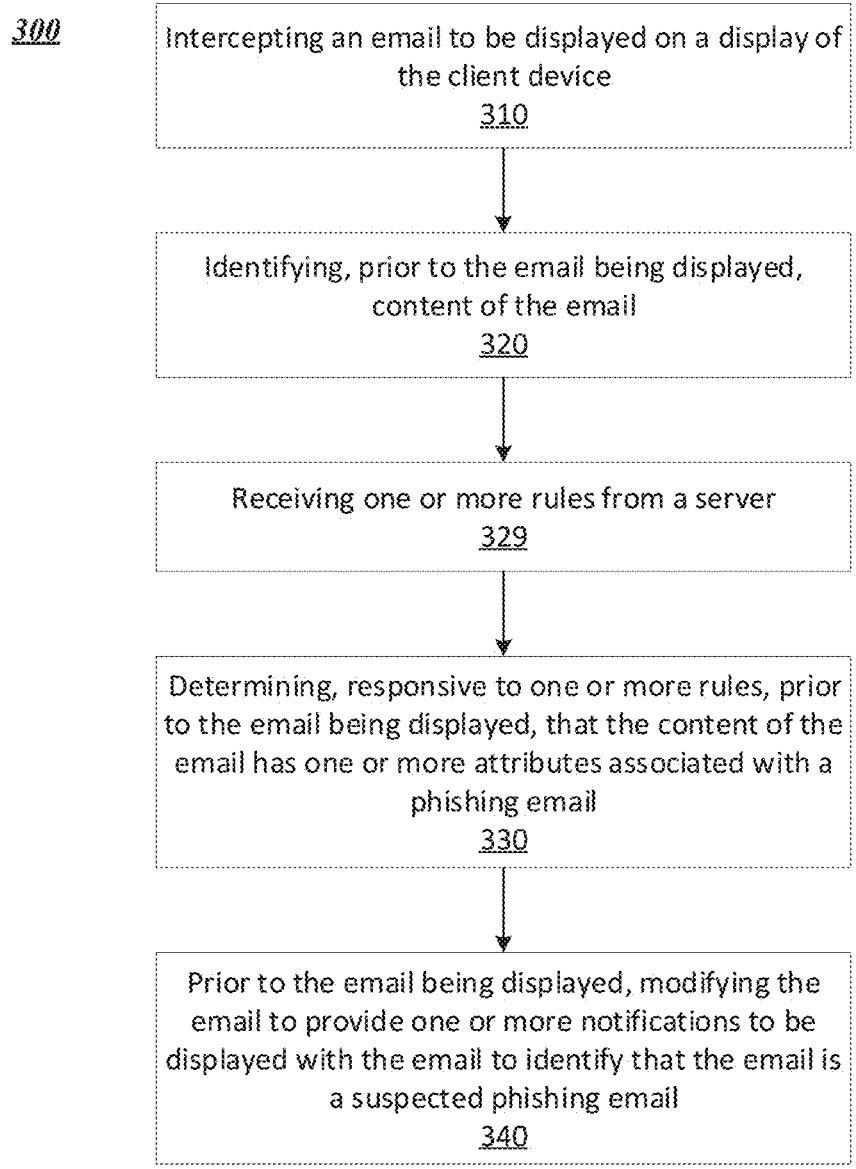
FIG. 3K depicts an implementation of a method for intercepting and modifying an email wherein the method comprises receiving one or more rules from a server.

Referring to FIG. 3K in a general overview, FIG. 3K depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 329, the agent receives one or more rules from the server. In step 330, the agent determines in response to one or more rules of the agent, prior to the email being displayed, that the content of the email has one or more attributes associated with a phishing email. In step 340, the agent modifies the email, prior to the email being displayed, to identify that the email is a suspected phishing email.

Figure 3L:
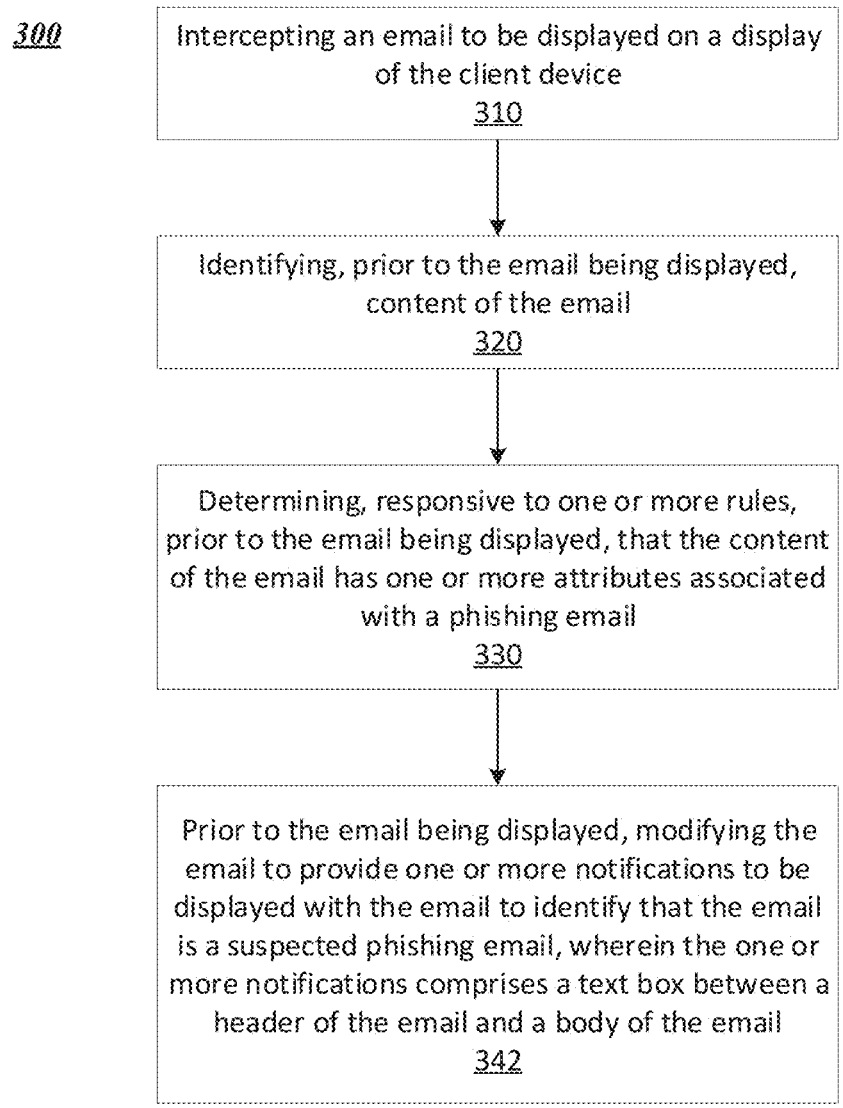
FIG. 3L depicts an implementation of a method for intercepting and modifying an email wherein the one or more notifications comprise a text box between a header of the email and a body of the email.

Referring to FIG. 3L in a general overview, FIG. 3L depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 330, the agent determines in response to one or more rules of the agent, prior to the email being displayed, that the content of the email has one or more attributes associated with a phishing email. In step 342, the agent modifies the email, prior to the email being displayed, to provide one or more notifications to be displayed with the email to identify that the email is a suspected phishing email, wherein the one or more notifications comprises a text box between a header of the email and a body of the email.

Figure 3M:
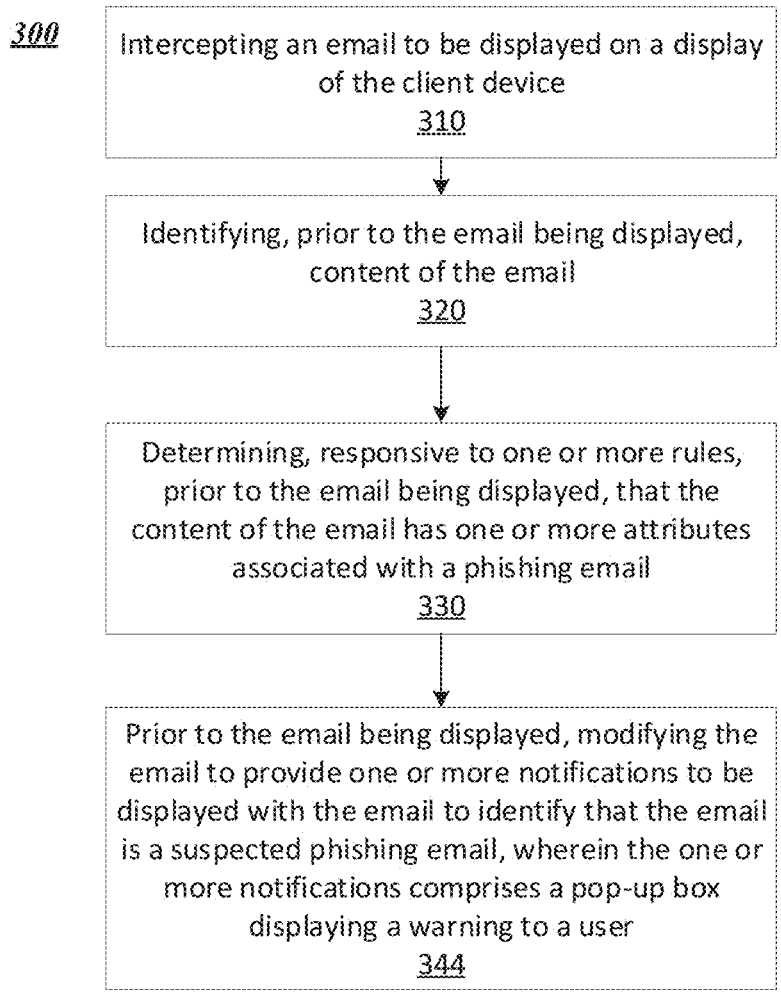
FIG. 3M depicts an implementation of a method for intercepting and modifying an email wherein the one or more notifications comprise a pop-up box displaying a warning to a user.

Referring to FIG. 3M in a general overview, FIG. 3M depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 330, the agent determines in response to one or more rules of the agent, prior to the email being displayed, that the content of the email has one or more attributes associated with a phishing email. In step 344, the agent modifies the email, prior to the email being displayed, to provide one or more notifications to be displayed with the email to identify that the email is a suspected phishing email, wherein the one or more notifications comprise a pop-up box displaying a warning to a user.

Figure 3N:
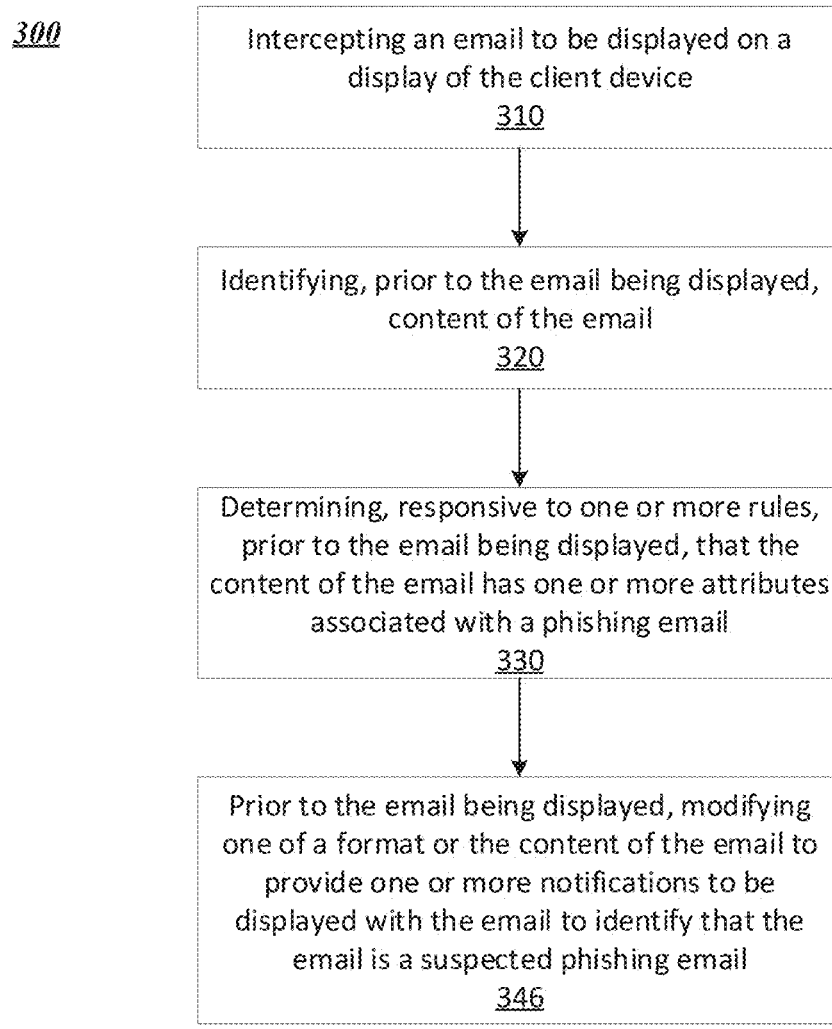
FIG. 3N depicts an implementation of a method for intercepting and modifying an email wherein the method comprises modifying one of a format or the content of an email to provide one or more notification displayed with the email and identifying the email as a suspected phishing email.

Referring to FIG. 3N in a general overview, FIG. 3N depicts an implementation of a method 350 for determining an email is a phishing email prior to displaying the email. In step 310, the advanced hazard warning system intercepts an email, by an agent executing on a client device, to be displayed on a display of the client device. In step 320, the agent identifies the content of the email prior to the email being displayed. In step 330, the agent determines in response to one or more rules of the agent, prior to the email being displayed, that the content of the email has one or more attributes associated with a phishing email. In step 346, the agent modifies the email, prior to the email being displayed, modifying one of a format or the content of the email to provide one or more notifications to be displayed with the email to identify that the email is a suspected phishing email.

Figure 4:
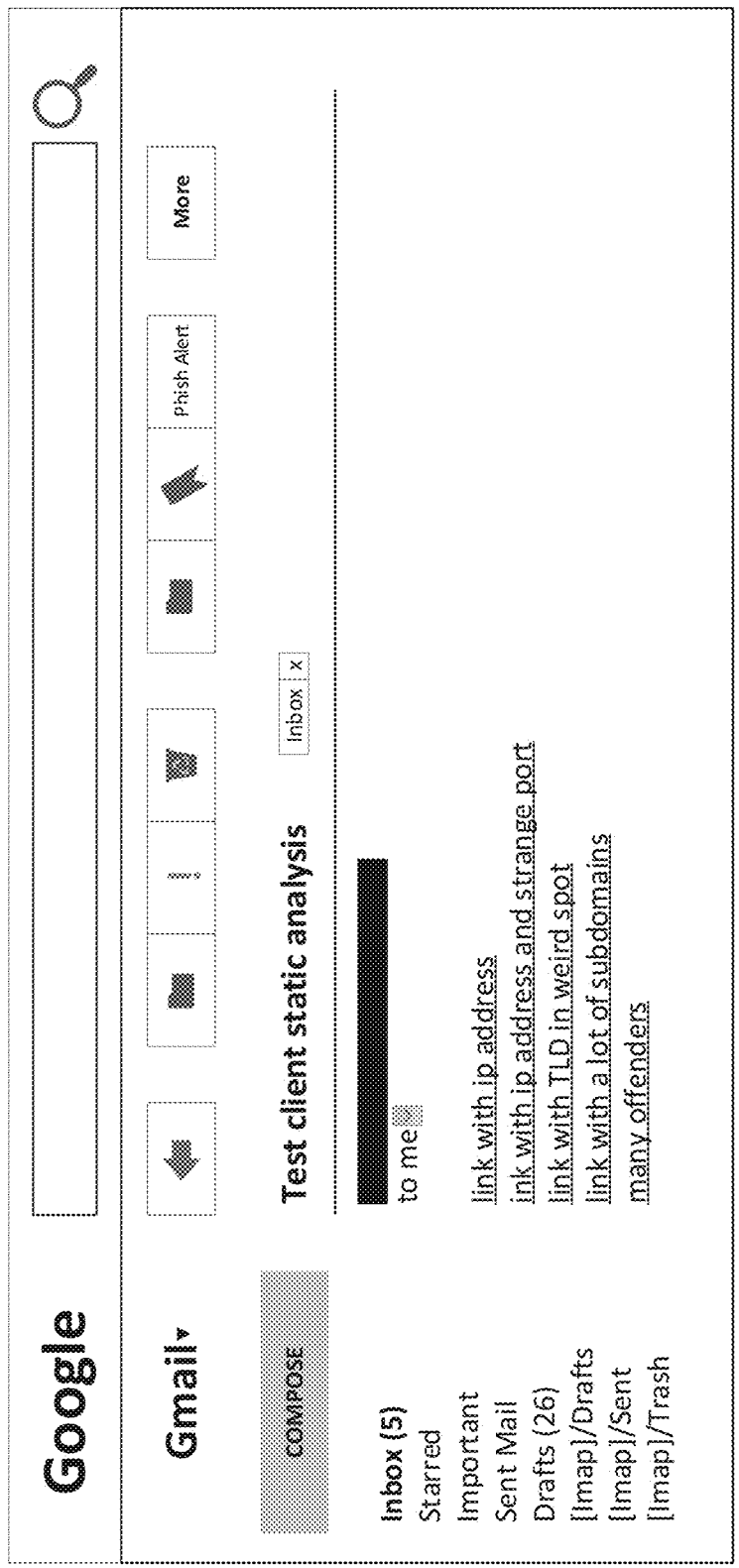
FIG. 4 is an illustration of the system notifying a user that an email may be a phishing email by showing hyperlinks in a received email that the system has identified as suspect.

FIG. 4 is an illustration of the system notifying a user that an email may be a phishing email by showing hyperlinks in a received mail that have been identified by the client-side advanced hazard warning system analysis engine. The illustration shows different hyperlinks that could cause the system to identify the email as a suspected phishing email. In one embodiment, the link includes an IP address. In another embodiment, the link consists of an IP address and a strange port. In one embodiment, the link with the top-level domain is found in an unusual spot. In an embodiment, the link has too many subdomains, and in other embodiments, there may be many other offenders. These links will be analyzed by one or more of the analysis modules in the client-side analysis engine, in some embodiments using analysis rules. Once the advanced hazard warning system identifies that the email is suspect of being a phishing email, it notifies the user. As demonstrated in FIG. 4, it can be shown to the user through a pop-up box, which explains to the user the email is suspicious of being a phishing email and why.

Figure 5:
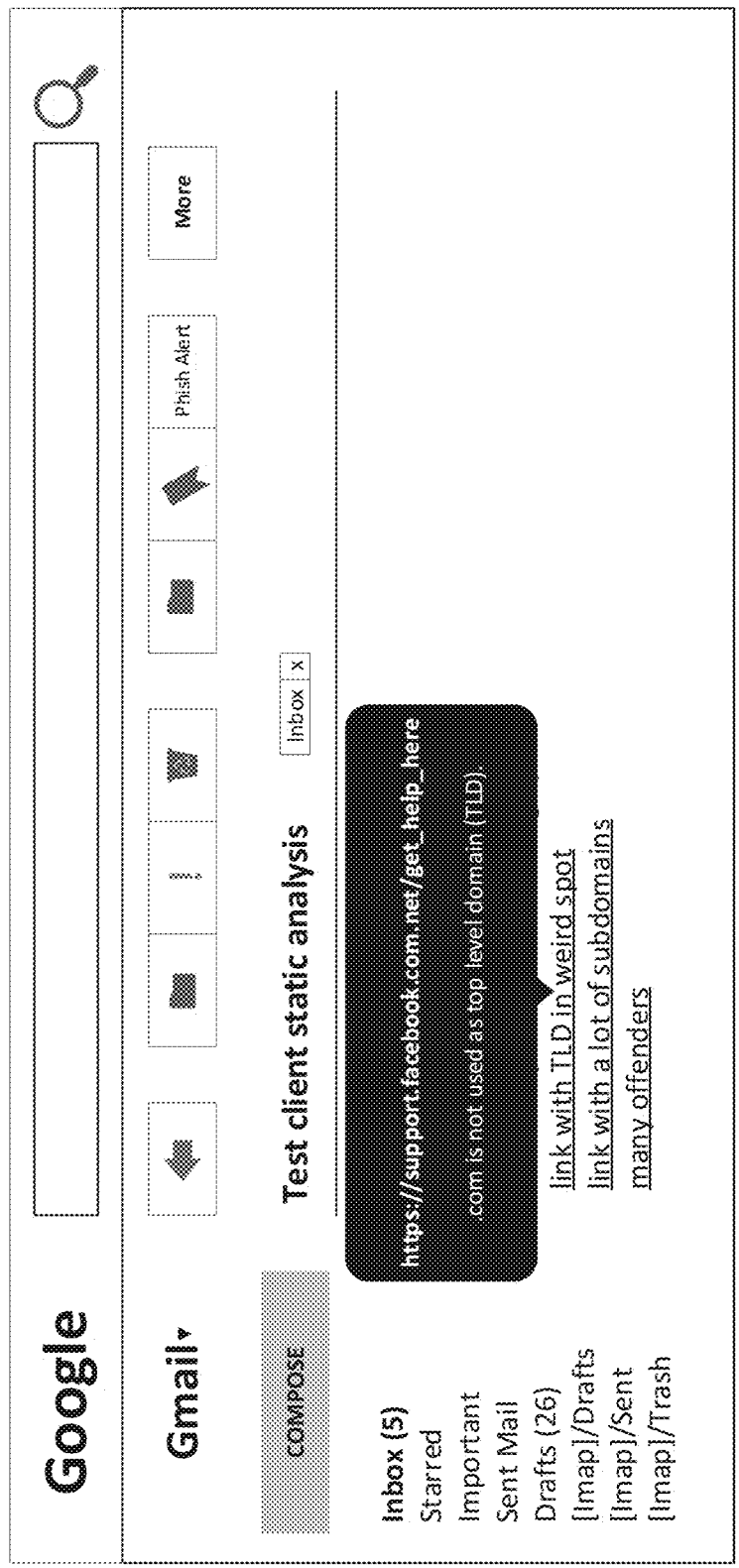
FIG. 5 is an illustration of the system notifying a user than an email may be a phishing email by showing a link in the email that the system has identified as suspect with a top-level domain (TLD) in an unusual spot.

FIG. 5 is an illustration of the system notifying a user than an email may be a phishing email by showing a link with the top-level domain (TLD) in an unusual spot in a received email that the system has identified as suspect. In this embodiment the link, https://support_facebook.com.net/get_help_here, contains a top-level domain in an unnatural place and .com is not used as the top-level domain. The client side hazard warning system analysis engine analyzes this link, using link analysis, and domain analysis specifically the top-level domain analysis. Once the advanced hazard warning system identifies that the email is suspect of being a phishing email, it notifies the user. As demonstrated in FIG. 5, it can be shown to the user through a pop-up box, which explains to the user that the email is suspicious of being a phishing email and why.

Figure 6:
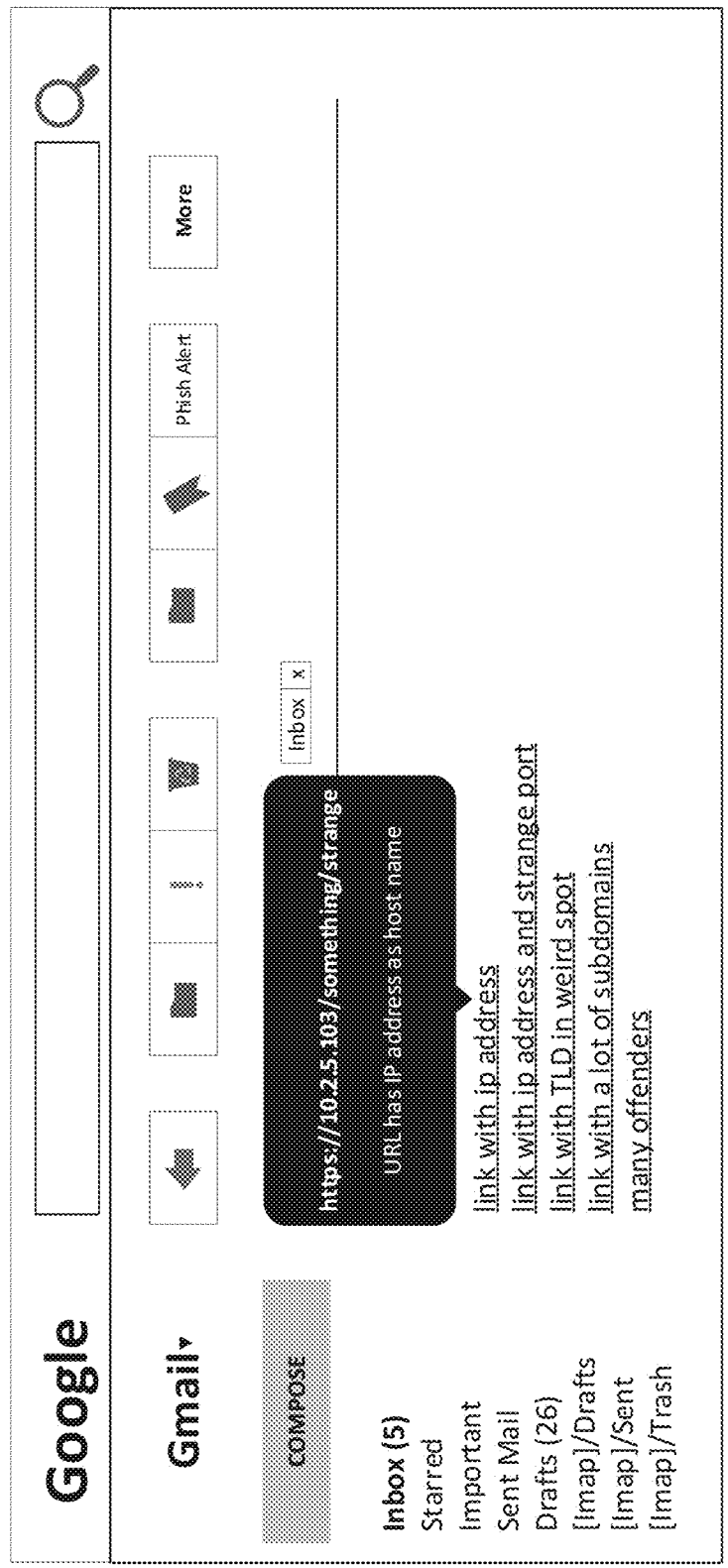
FIG. 6 is an illustration of the system notifying a user that an email may be a phishing email by showing a link with an IP address as the hostname in a received email that the system has identified as suspect.

FIG. 6 is an illustration of the system notifying a user that an email may be a phishing email by showing a link with an IP address as the hostname in a received email that the system has identified as suspect; The advanced hazard warning system will analyze the email, and once it finds that the email is suspicious of being a phishing email, it notifies the user. As demonstrated in FIG. 6, it can be shown to the user through a pop-up box, which explains to the user that the email is suspicious of being a phishing email and why.

Figure 7:
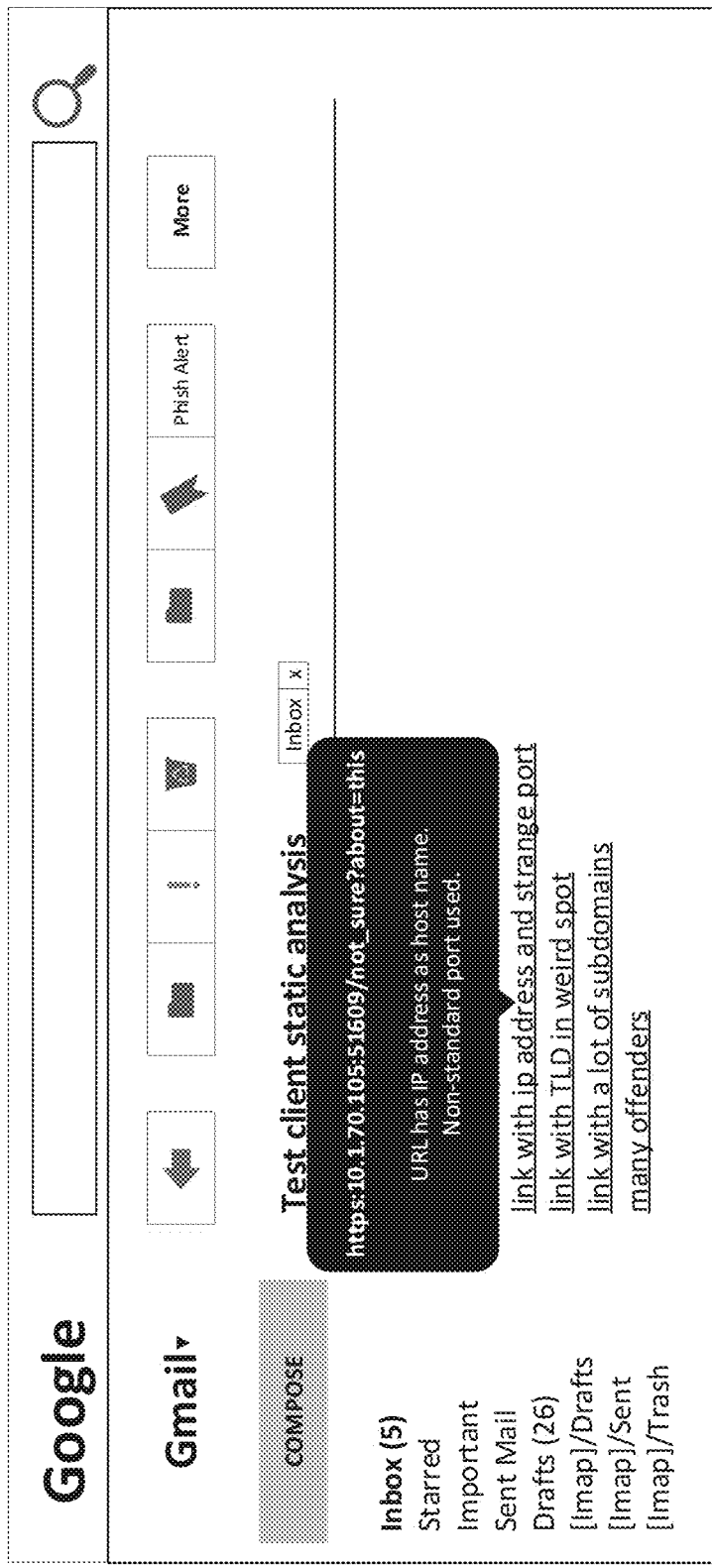
FIG. 7 is an illustration of the system notifying a user that an email may be a phishing email by showing a link with an IP address and a strange port as the hostname in a received mail that the system has identified as suspect.

FIG. 7 is an illustration of the system notifying a user that an email may be a phishing email by showing a link with an IP address as the hostname and a strange port in a received mail that the system has identified as suspect. This email would trigger the client-side analysis engine, where the analysis engine would use the IP analysis, link analysis, and port analysis module and the analysis rules, to analyze if the link, and once the analysis engine concludes the email is suspected of being a phishing email it notifies the user. As FIG. 7 illustrates, once a suspicious characteristic is found in the email, the advanced hazard warning system notifies the user, through a pop-up box which illustrates the suspicious characteristics of the email.

Figure 8:
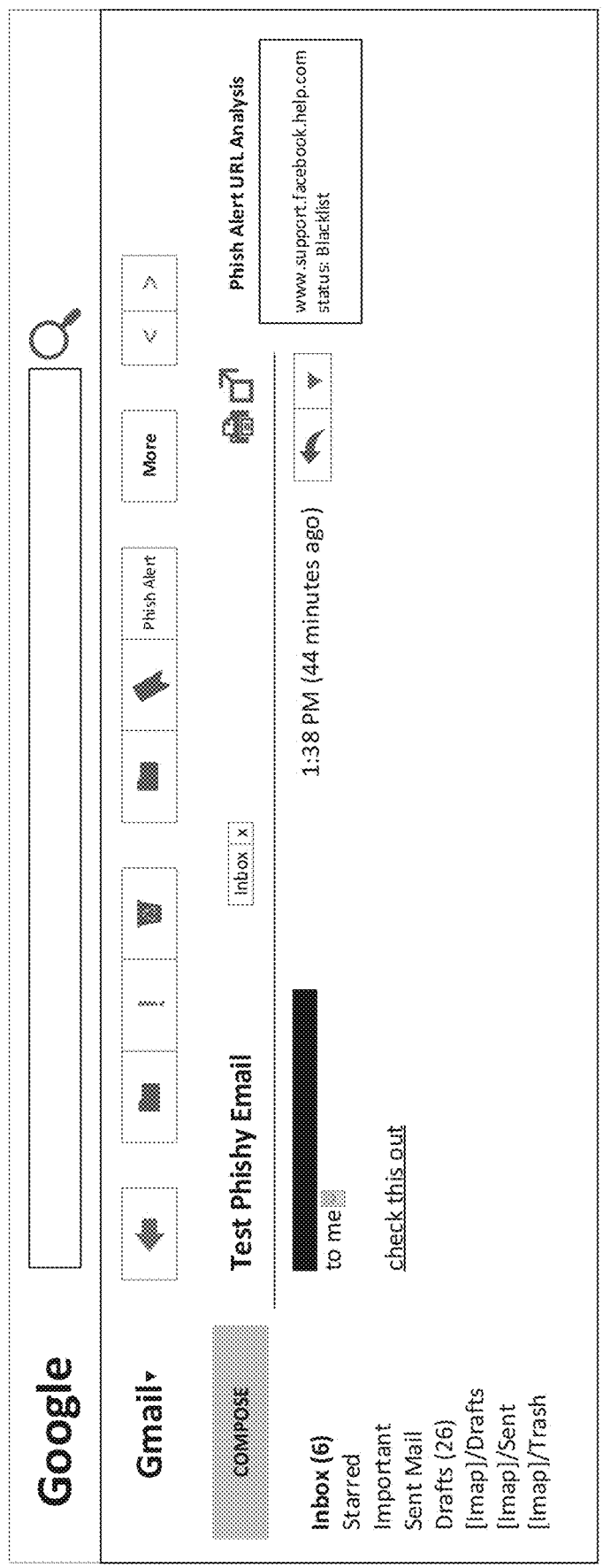
FIG. 8 is an illustration of the system notifying a user that an email may be a phishing email by showing using a server-side analysis of a URL in a received email wherein the URL is on a URL blacklist.

FIG. 8 is an illustration of the system notifying a user that an email may be a phishing email by showing using a server-side analysis of a URL in a received email in which the system indicates that the URL is on a server-side URL blacklist. The server-side advanced hazard warning system contains list of trusted domains and untrusted domains. Once the email is received, the server side advanced hazard warning system analysis engine checks the domain against the list of domain. As shown in FIG. 8, when the domain is found to be on the list of untrusted domains, the user is notified. In this illustration, the system notifies the user that there has been a successful phish alert analysis of the URL, and a pop-up box appears on the side of the page, indicating that the domain is blacklisted.

Figure 9:
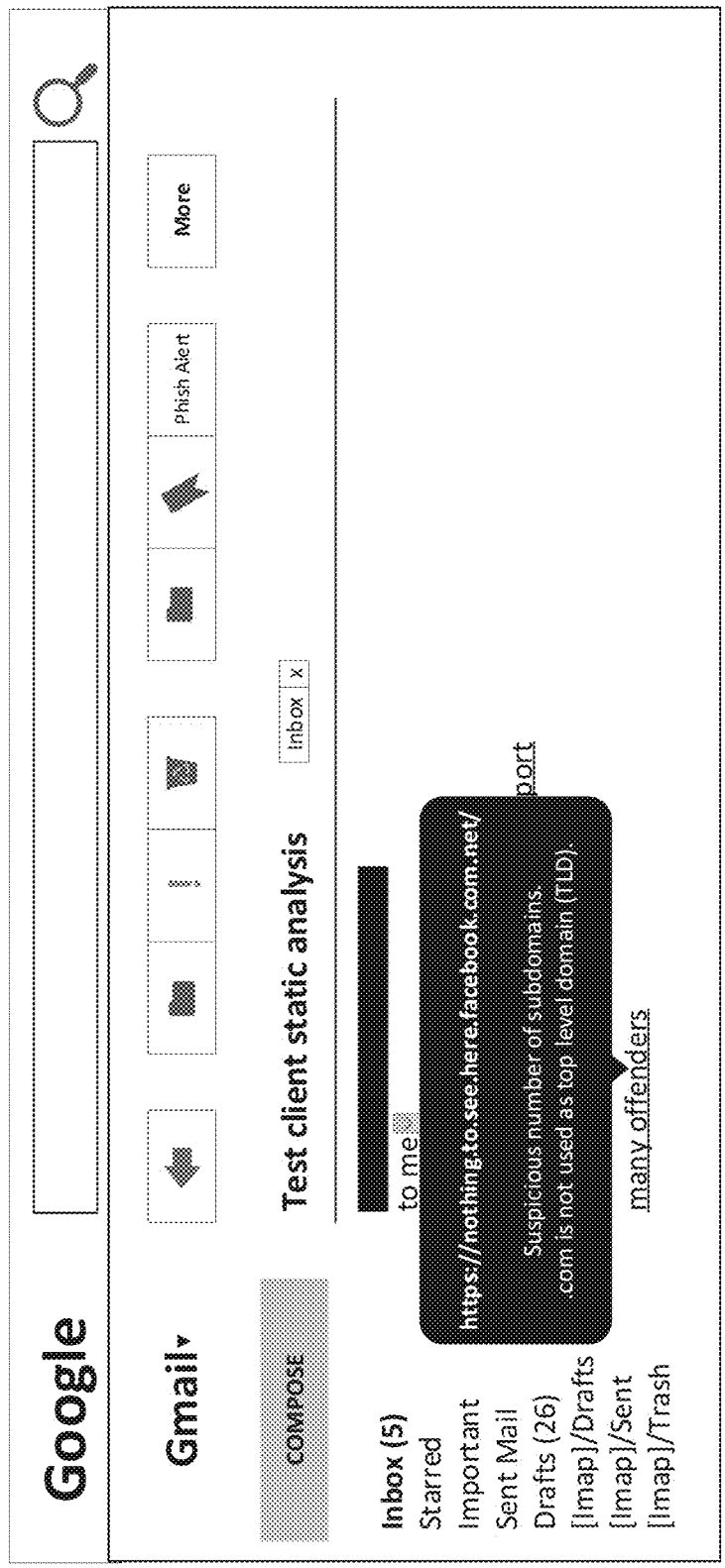
FIG. 9 is an illustration of the system notifying a user that an email may be a phishing email by showing a link with one or more flags comprising a suspicious number of subdomains and .com not used as the top-level domain (TLD) in a received mail that the system has identified as suspect.

FIG. 9 is an illustration of the system notifying a user that an email may be a phishing email by showing a link with one or more flags, including a suspicious number of subdomains and .com is not used as the top-level domain in a received mail that the system has identified as suspect. The client-side analysis engine analyzes the email, through different domain analysis modules, including subdomain analysis and top-level domain analysis. Through each of these analysis, the suspicious features of the email are identified, and as demonstrated in FIG. 9, it can be shown to the user through a pop-up box, which explains to the user that the email is suspicious of being a phishing email and why.

Figure 10:
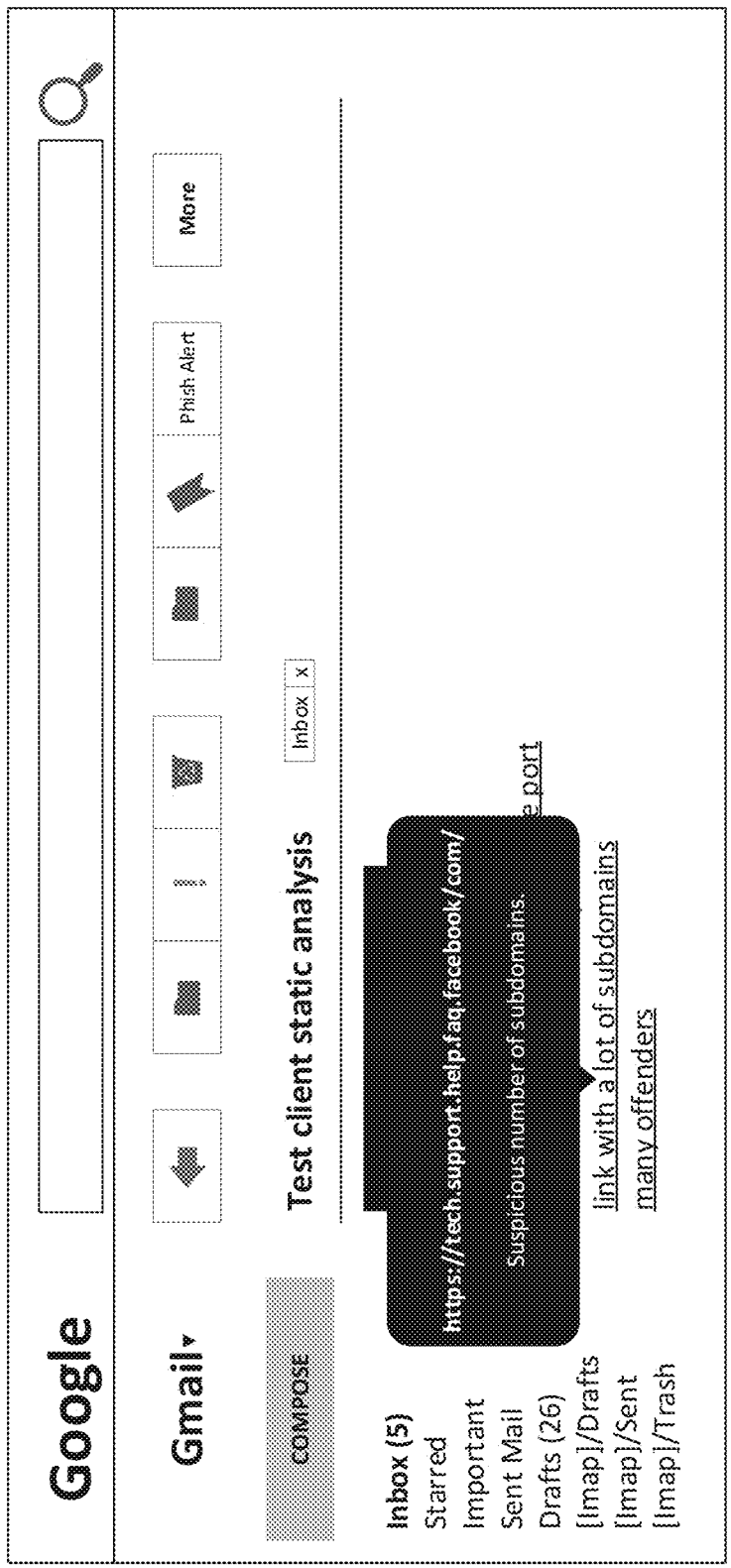
FIG. 10 is an illustration of the system notifying a user that an email may be a phishing email by showing a link with a suspicious number of subdomains in a received email that the system has identified as suspect.

FIG. 10 is an illustration of the system notifying a user that an email may be a phishing email by showing a link with a suspicious number of subdomains in a received mail that the system has identified as suspect. The client-side domain analysis, and more specifically the subdomain analysis, analyzes the email and once it determines the number of subdomains are suspicious, it notifies the user. As demonstrated in FIG. 10, this notification can be in the form of a pop-up box notifying the user the email is suspicious of being a phishing email and why it is suspicious.

As appreciated by one of skill in the art, the system may be implemented with other messaging applications 270 such as Gmail, and whatever browser the client is using to look at Gmail. For example, the system may need a browser plug-in to track Gmail. In some embodiments, an email client is not needed at all, and the system can use a plug-in embedded directly in applications that are not associated with an email client.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for determining an email is a suspected phishing email prior to displaying the email, the method comprising:
    (a) intercepting, by an agent executing on a client device, an email to be displayed on a display of the client device in response to detecting a process for the email instantiated by a messaging application responsive to an action of a user, the agent comprising a plug-in to the messaging application;
    (b) pausing, by the plug-in of the agent, the process prior to displaying the intercepted email;
    (c) identifying, by the plug-in of the agent prior to the intercepted email being displayed, content of the intercepted email;
    (d) determining, by the plug-in responsive to one or more rules of the agent prior to the intercepted email being displayed, that the content of the intercepted email has one or more attributes associated with a phishing email; and
    (e) modifying, by the plug-in of the agent prior to the intercepted email being displayed, the intercepted email to provide one or more notifications to be displayed with the intercepted email to identify that the intercepted email is a suspected phishing email.

2. The method of claim 1, wherein the one or more notifications are displayed with the intercepted email responsive to a user one of previewing or opening the email.

3. The method of claim 1, wherein (d) further comprises applying, by the agent, the one or more rules to the content of the intercepted email.

4. The method of claim 1, wherein (d) further comprises transmitting, by the agent, portions of the content of the intercepted email to a server to determine by the server whether the intercepted email is a suspected phishing email.

5. The method of claim 4, further comprising receiving, by the agent from the server, an indication that the content of the intercepted email is associated with the phishing email.

6. The method of claim 5, further comprising receiving, by the agent from the server, one of identification of or information on the one or more attributes of the content of the intercepted email associated with the phishing email.

7. The method of claim 5, further comprising receiving, from the server, an identification of whether the portion of the content has an attribute associated with one or more phishing emails, the indication received by the server from a second server.

8. The method of claim 5, further comprising receiving, from the server, a determination from the portion of the content of the intercepted email that a reply-to-address of the intercepted email does not correspond to a sender of the intercepted email.

9. The method of claim 1, wherein (d) further comprises determining, by the agent, that a link in the content of the intercepted email has a number of subdomains exceeding a predetermined threshold.

10. The method of claim 1, wherein the one or more notifications comprises one of the following: a text box between a header of the intercepted email and a body of the intercepted email, a pop-up box displaying a warning to a user or modification of one of a format or the content of the intercepted email to provide the one or more notifications.

11. A system for determining an email is a suspected phishing email prior to displaying the email, the system comprising:
    an agent executing on a processor, coupled to memory, of a client device, wherein the agent comprises a plug-in to a messaging application and the plug-in is configured to:
    intercept an email to be displayed on a display of the client device in response to detecting a process for the email instantiated by the messaging application responsive to an action of a user;
    pause the process prior to displaying the intercepted email;
    identify, prior to the intercepted email being displayed, content of the intercepted email;
    determine, responsive to one or more rules of the agent prior to the intercepted email being displayed, that the content of the intercepted email has one or more attributes associated with a phishing email; and
    modify, prior to the intercepted email being displayed, the intercepted email to provide one or more notifications to be displayed with the intercepted email to identify that the intercepted email is a suspected phishing email.

12. The system of claim 11, wherein the one or more notifications are displayed with the intercepted email responsive to a user one of previewing or opening the intercepted email.

13. The system of claim 11, wherein the agent is further configured to transmit portions of the content of the intercepted email to a server to determine by the server whether the intercepted email is a suspected phishing email.

14. The system of claim 13, wherein the agent is further configured to receive from the server an indication that the content of the intercepted email is associated with the phishing email.

15. The system of claim 13, wherein the agent is further configured to receive from the server one of identification of or information on the one or more attributes of the content of the intercepted email associated with the phishing email.

16. The system of claim 13, wherein the agent is further configured to receive, from the server, an identification of whether portion of the content of the intercepted email has an attribute associated with one or more phishing emails, the indication received by the server from a second server.

17. The system of claim 11, wherein the agent is further configured to receive, from the server, a determination from the portion of the content of the intercepted email that a reply-to-address of the intercepted email does not correspond to a sender of the intercepted email.

18. The system of claim 11, wherein the agent is further configured to determine that a link in the content of the intercepted email has a number of subdomains exceeding a predetermined threshold.

* * * * *